(12) United States Patent
Na et al.

(10) Patent No.: US 11,539,504 B2
(45) Date of Patent: Dec. 27, 2022

(54) HOMOMORPHIC OPERATION ACCELERATOR AND HOMOMORPHIC OPERATION PERFORMING DEVICE INCLUDING THE SAME

(71) Applicant: SAMSUNG ELECTRONICS CO., LTD., Suwon-si (KR)

(72) Inventors: Hanbyeul Na, Yongin-si (KR); Sumin Kim, Hwaseong-si (KR); Hongrak Son, Anyang-si (KR); Junho Shin, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/336,625

(22) Filed: Jun. 2, 2021

(65) Prior Publication Data
US 2022/0116198 A1    Apr. 14, 2022

(30) Foreign Application Priority Data

Oct. 12, 2020  (KR) ........................ 10-2020-0131125

(51) Int. Cl.
*H04L 9/00* (2022.01)
*H04L 9/30* (2006.01)
(Continued)

(52) U.S. Cl.
CPC ............ *H04L 9/008* (2013.01); *H04L 9/3006* (2013.01); *H04L 9/3093* (2013.01); *H04L 2209/12* (2013.01)

(58) Field of Classification Search
CPC ..... H04L 9/005; H04L 9/3006; H04L 9/3093; H04L 2209/12; H04L 2209/122;
(Continued)

(56) References Cited

U.S. PATENT DOCUMENTS 8,565,435 B2   10/2013  Gentry et al.
10,057,057 B2   8/2018  Gentry et al.
(Continued)

FOREIGN PATENT DOCUMENTS

KR   10-1449239 B1   10/2014
KR   10-2040106 B1   11/2019

OTHER PUBLICATIONS

Accelerating Fully Homomorphic Encryption in Hardware, by Sunar et al. (Year: 2015).*

(Continued)

*Primary Examiner* — Vu V Tran
(74) *Attorney, Agent, or Firm* — Sughrue Mion, PLLC

(57) ABSTRACT

A homomorphic operation accelerator includes a plurality of circuits and a homomorphic operation managing circuit. The plurality of circuits may perform homomorphic operations. The homomorphic operation managing circuit may receive cipher text data, homomorphic encryption information and homomorphic operation information from an external device. The homomorphic operation managing circuit may activate or deactivate each of a plurality of enable signals applied to the plurality of circuits based on the homomorphic encryption information and the homomorphic operation information. The homomorphic operation managing circuit may activate or deactivate each of the plurality of circuits based on the plurality of enable signals. The homomorphic encryption information may be associated with a homomorphic encryption algorithm used to generate the cipher text data. The homomorphic operation information may be associated with the homomorphic operations to be performed on the cipher text data.

20 Claims, 15 Drawing Sheets

(51) Int. Cl.
*H04L 9/08* (2006.01)
*G06F 7/46* (2006.01)

(58) Field of Classification Search
CPC . H04L 9/008; H04L 9/0816; H04L 2209/125; G06F 7/461; G06F 7/462
See application file for complete search history.

(56) References Cited

U.S. PATENT DOCUMENTS

| | | | |
|---|---|---|---|
| 10,298,385 B2 | 5/2019 | Khedr et al. | |
| 10,778,409 B2 | 9/2020 | Cheon et al. | |
| 2011/0243320 A1* | 10/2011 | Halevi | H04L 9/0861 380/30 |
| 2015/0312028 A1 | 10/2015 | Cheon et al. | |
| 2018/0294950 A1* | 10/2018 | Khedr | G09C 1/00 |
| 2018/0375639 A1 | 12/2018 | Lauter et al. | |
| 2019/0007197 A1* | 1/2019 | Laine | H04L 9/008 |
| 2019/0026146 A1* | 1/2019 | Peffers | G06F 9/466 |
| 2019/0386815 A1 | 12/2019 | Satpathy et al. | |
| 2020/0076570 A1 | 3/2020 | Musuvathi et al. | |
| 2020/0162235 A1 | 5/2020 | Cheon et al. | |
| 2020/0252199 A1 | 8/2020 | Cheon et al. | |

OTHER PUBLICATIONS

Communication dated Nov. 29, 2021, issued by the European Patent Office in counterpart European Application No. 21178812.0.
Cousins et al., "Designing an FPGA-Accelerated Homomorphic Encryption Co-Processor," IEEE Transactions on Emerging Topics in Computing, vol. 5, No. 2, pp. 193-206, Apr.-Jun. 2017, XP011651948.
Riazi et al., "HEAX: An Architecture for Computing on Encrypted Data," Association for Computing Machinery, ASPLOS'20, Mar. 16-20, 2020, pp. 1295-1309, XP058460507.
Roy et al., "Modular Hardware Architecture for Somewhat Homomorphic Function Evaluation," International Association for Cryptologic Research 2015, CHES 2015, LNCS 9293, pp. 164-184, 2015, XP047518675.
Turan et al., "HEAWS: An Accelerator for Homomorphic Encryption on the Amazon AWS FPGA," IEEE Transactions on Computers, vol. 69, No. 8, Aug. 2020, pp. 1185-1196, XP011797375.
Dijk et al., "Fully Homomorphic Encryption over the Integers," International Association for Cryptologic Research 2010, EUROCRYPT 2010, LNCS 6110, pp. 24-43, 2010, XP047179782.

* cited by examiner

|  | INS BASED | CNS BASED |
|---|---|---|
| NON-RNS BASED | FIRST HOMOMORPHIC ENCRYPTION ALGORITHM | SECOND HOMOMORPHIC ENCRYPTION ALGORITHM |
| RNS BASED | THIRD HOMOMORPHIC ENCRYPTION ALGORITHM | FOURTH HOMOMORPHIC ENCRYPTION ALGORITHM |

FIG. 11

```
Algorithm CRT

INPUT: CRT_IN, TB1_IN
OUTPUT: CRT_OUT for ( i=0 ; i < N1 ; i = i + 1 ) do
    for ( j = 0 ; j < N2 ; j = j + 1 ) do
        A ← 0
        for ( k = 0 ; k < N3 ; k = k + 1 ) do
            A += CRT_IN [i][k] × TB1_IN [j][k]
        CRT_OUT [i][j] = mod( A, p[i] )
```

FIG. 12

|  | KEY SWITCHING CIRCUIT |
| --- | --- |
| FIRST HOMOMORPHIC ENCRYPTION ALGORITHM | FIRST KEY SWITCHING CIRCUIT |
| SECOND HOMOMORPHIC ENCRYPTION ALGORITHM | SECOND KEY SWITCHING CIRCUIT |
| THIRD HOMOMORPHIC ENCRYPTION ALGORITHM | THIRD KEY SWITCHING CIRCUIT |
| FOURTH HOMOMORPHIC ENCRYPTION ALGORITHM | FOURTH KEY SWITCHING CIRCUIT | ns # HOMOMORPHIC OPERATION ACCELERATOR AND HOMOMORPHIC OPERATION PERFORMING DEVICE INCLUDING THE SAME

CROSS-REFERENCE TO RELATED APPLICATION

This application is based on and claims priority under 35 USC § 119 to Korean Patent Application No. 10-2020-0131125, filed on Oct. 12, 2020, in the Korean Intellectual Property Office (KIPO), the disclosure of which is incorporated by reference herein in its entirety.

BACKGROUND

1. Field

Example embodiments relate generally to semiconductor integrated circuits, and more particularly to a homomorphic operation accelerator and a homomorphic operation performing device including the homomorphic operation accelerator.

2. Descriptions about the Related Art

A homomorphic encryption technology supports operations such as a computation operation, a search operation and/or an analysis operation in encrypted state. Recently, the homomorphic encryption technology is becoming more crucial as leakage of personal information becomes an increasing problem. However, a size of a homomorphic cipher text encrypted according to the homomorphic encryption technology may reach several tens of times a size of a plaintext, and a computational complexity of operations supported by the homomorphic encryption technology may also be very high.

SUMMARY

Some example embodiments may provide a homomorphic operation accelerator and a homomorphic operation performing device, capable of reducing a usage of hardware resources corresponding to homomorphic encryption algorithm.

According to an aspect of the disclosure, there is provided a homomorphic operation accelerator comprising: a plurality of circuits configured to perform homomorphic operations; and a homomorphic operation managing circuit configured to: receive cipher text data, homomorphic encryption information and homomorphic operation information, the homomorphic encryption information being associated with a homomorphic encryption algorithm used to generate the cipher text data, and the homomorphic operation information being associated with homomorphic operations to be performed on the cipher text data; selectively activate or deactivate each of a plurality of enable signals applied to the plurality of circuits based on the homomorphic encryption information and the homomorphic operation information; and activate or deactivate each of the plurality of circuits based on the plurality of enable signals, wherein the homomorphic operations are performed on the cipher text data based on activated circuits among the plurality of circuits.

According to another aspect of the disclosure, there is provided a homomorphic operation performing device comprising: a communication interface configured to communicate with a first homomorphic encryption client to receive cipher text data and a second homomorphic encryption client to receive homomorphic operation information associated with homomorphic operations to be performed on the cipher text data; and a homomorphic operation accelerator including a plurality of circuits that perform the homomorphic operations, the homomorphic operation accelerator configured to: selectively activate or deactivate each of a plurality of enable signals applied to the plurality of circuits based on the homomorphic operation information and a homomorphic encryption information, the homomorphic encryption information being associated with a homomorphic encryption algorithm used to generate the cipher text data; and activate or deactivate each of the plurality of circuits based on the plurality of enable signals, wherein the homomorphic operations are performed on the cipher text data based on activated circuits among the plurality of circuits.

According to another aspect of the disclosure, there is provided a homomorphic operation accelerator comprising: a plurality of circuits including a homomorphic adder, a homomorphic multiplier and a bootstrapping circuit; and a homomorphic operation managing circuit configured to: receive cipher text data, homomorphic encryption information and homomorphic operation information from an external device, the homomorphic encryption information being associated with a homomorphic encryption algorithm used to generate the cipher text data, the homomorphic operation information being associated with homomorphic operations to be performed on the cipher text data; selectively activate or deactivate each of a plurality of enable signals applied to the plurality of circuits based on the homomorphic encryption information and the homomorphic operation information; activate or deactivate each of the plurality of circuits based on the plurality of enable signals; and control one of the homomorphic adder, the homomorphic multiplied and the bootstrapping circuit based on the homomorphic encryption information and the homomorphic operation information to perform one of a homomorphic addition, a homomorphic multiplication and a bootstrapping on the cipher text data, wherein the homomorphic operations are performed on the cipher text data based on activated circuits among the plurality of circuits.

According to another aspect of the disclosure, there is provided a homomorphic operation performing device comprising: a memory storing one or more instructions; and a processor configured to execute the one or more instruction to: receive cipher text data, homomorphic encryption information and homomorphic operation information, the homomorphic encryption information being associated with a homomorphic encryption algorithm used to generate the cipher text data, and the homomorphic operation information being associated with homomorphic operations to be performed on the cipher text data; generate one or more enable signals to selectively activate one or more first circuits, among a plurality of circuits configured to perform homomorphic operations, based on the homomorphic encryption information and the homomorphic operation information; selectively activate one or more first circuits based on the one or more enable signals; and control the one or more first circuit to perform the homomorphic operations on the cipher text data based on the one or more first circuit that are selectively activated, wherein second circuits other than the one or more first circuits, among the plurality of circuits, are deactivated.

The homomorphic operation managing circuit may control one of the homomorphic adder, the homomorphic multiplied and the bootstrapping circuit based on the homomorphic encryption information and the homomorphic operation information to perform one of a homomorphic addition, a homomorphic multiplication and a bootstrapping on the cipher text data.

The homomorphic operation accelerator and the homomorphic operation performing device according to example embodiments may receive homomorphic encryption information and homomorphic operation information, may selectively deactivate a plurality of circuits included in the homomorphic operation performing device based on the homomorphic encryption information and the homomorphic operation information. Accordingly, by reducing a usage of hardware resources corresponding to homomorphic encryption algorithm, the homomorphic operations may be efficiently performed.

BRIEF DESCRIPTION OF THE DRAWINGS

Example embodiments of the disclosure will be more clearly understood from the following detailed description taken in conjunction with the accompanying drawings.

FIG. 11 is a diagram for describing an example of a CRT operation performed in a first CRT-NTT circuit in FIG. 9.

FIG. 12 is a diagram for describing a process of selectively deactivating a key switching circuit in FIG. 8 by a homomorphic operation managing circuit in FIG. 7.

DETAILED DESCRIPTION OF THE EMBODIMENTS

Figure 1:
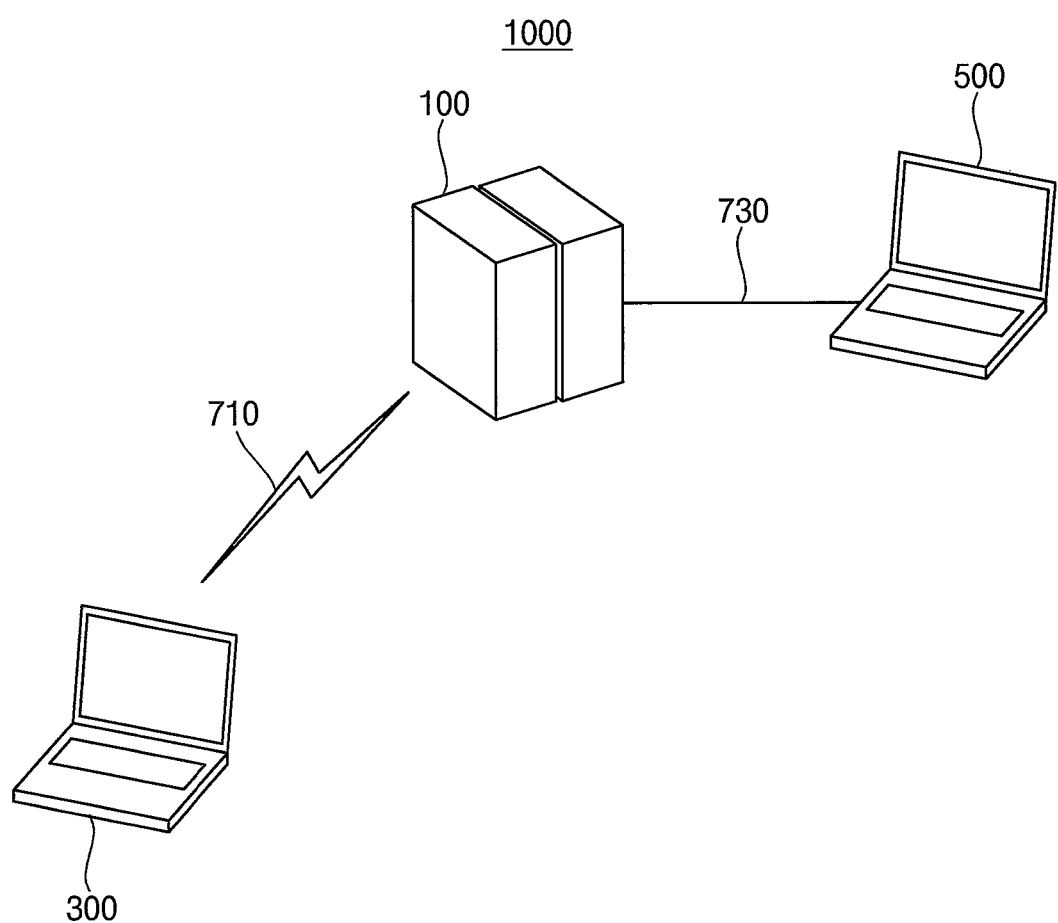
FIG. 1 is a diagram illustrating a homomorphic operation performing system including a homomorphic operation performing device according to one or more example embodiments.

Various example embodiments will be described more fully hereinafter with reference to the accompanying drawings, in which some example embodiments are shown. In the drawings, like numerals refer to like elements throughout. The repeated descriptions may be omitted.

FIG. 1 is a diagram illustrating a homomorphic operation performing system including a homomorphic operation performing device according to one or more example embodiments.

Referring to FIG. 1, a homomorphic operation performing system 1000 may include a homomorphic encryption processing server 100 and homomorphic encryption clients including a first homomorphic encryption client 300 and a second homomorphic encryption client 500.

The homomorphic encryption processing server 100, the first homomorphic encryption client 300 and the second homomorphic encryption client 500 may perform at least one of homomorphic encryptions, homomorphic decryptions or homomorphic operations according to homomorphic encryption technology. In the homomorphic encryption technology, first result data obtained based on plaintext data and second result data obtained based on the plaintext data may be substantially the same as each other. The first result data may be generated by performing a specific operation on the plaintext data and performing encryption on the plaintext data on which the specific operation is performed. The second result data may be generated by performing the encryption on the plaintext data and performing the specific operation on the encrypted plaintext data. For example, the homomorphic encryption technology may satisfy Equation 1.

$$OP(E(PD))=E(OP(PD)) \quad \text{[Equation 1]}$$

In Equation 1, PD is the plaintext data, E( ) is a function that performs the encryption, and OP( ) is a function that performs the specific operation. For example, when the specific operation corresponds to one of an addition or a multiplication, the homomorphic encryption technology may satisfy Equation2 or Equation 3 below.

$$E(PD1)+E(PD2)=E(PD1+PD2). \quad \text{[Equation 2]}$$

$$E(PD1)*E(PD2)=E(PD1*PD2) \quad \text{[Equation 3]}$$

The homomorphic encryption processing server 100, the first homomorphic encryption client 300 and the second homomorphic encryption client 500 may communicate with each other through networks 710 and 730. In some example embodiments, the first homomorphic encryption client 300 and the second homomorphic encryption client 500 may transmit to or request data from the homomorphic encryption processing server 100, and the homomorphic encryption processing server 100 may transmit to or request data from the first homomorphic encryption client 300 and the second homomorphic encryption client 500.

Data transmitted between the homomorphic encryption processing server 100 and the first homomorphic encryption client 300 through the first network 710 are cipher text data encrypted based on the homomorphic encryption technology. In some example embodiments, the first homomorphic encryption client 300 may generate cipher text data by performing homomorphic encryption on plaintext data, and transmit the cipher text data to the homomorphic encryption processing server 100. The homomorphic encryption processing server 100 may receive and store the ciphertext data from the first homomorphic encryption client 300 and then may perform homomorphic operations on the ciphertext data.

When the homomorphic encryption processing server 100 receives a request for the ciphertext data on which the homomorphic operations is performed from the first homomorphic encryption client 300, the homomorphic encryption processing server 100 may transmit the ciphertext data on which the homomorphic operations is performed to the first homomorphic encryption client 300, and the first homomorphic encryption client 300 may perform a homomorphic decryption on the transmitted ciphertext data to generate plaintext data.

Data transmitted between the homomorphic encryption processing server 100 and the second homomorphic encryption client 500 through the second network 730 may include a request for a predetermined homomorphic operations on the ciphertext data stored in the homomorphic encryption processing server 100 or a result generated by performing the homomorphic operations according to the request. In some example embodiments, unlike the ciphertext data transmitted between the homomorphic encryption processing server 100 and the first homomorphic encryption client 300, since the data transmitted between the homomorphic encryption processing server 100 and the second homomorphic encryption client 500 is only data including the request for the homomorphic operations or the result of performing the homomorphic operation, a separate homomorphic encryption technology may not be applied to the data transmitted between the homomorphic encryption processing server 100 and the second homomorphic encryption client 500.

In some example embodiments, the first homomorphic encryption client 300 may be an internet terminal used by a service user requesting an internet service using internet technology, the homomorphic encryption processing server 100 and the second homomorphic encryption client 500 may be an internet server or an internet terminal used by a service provider providing the internet service.

In some example embodiments, the first network 710 may be a long-distance wireless network for supporting communication of data between the homomorphic encryption processing server 100 and the first homomorphic encryption client 300, and the second network 730 may be a short-range wired network for supporting communication of security-enhanced data between the homomorphic encryption processing server 100 and the second homomorphic encryption client 500.

The homomorphic encryption processing server 100 may include a plurality of circuits for performing the homomorphic operations. When the homomorphic encryption processing server 100 receives a request to perform specific homomorphic operations on ciphertext data transmitted by the first homomorphic encryption client 300 from the second homomorphic encryption client 500, the homomorphic encryption processing server 100 may perform the homomorphic operations on the ciphertext data using the plurality of circuits.

The ciphertext data may be generated by performing homomorphic encryption by the first homomorphic encryption client 300, and may be generated in different forms according to a type of a homomorphic encryption algorithm used by the first homomorphic encryption client 300 to perform the homomorphic encryption. In some example embodiments, the homomorphic encryption processing server 100 may activate or deactivate each of the plurality of circuits based on homomorphic encryption information and homomorphic operation information. The homomorphic encryption information may be associated with a homomorphic encryption algorithm used to generate the ciphertext data, and the homomorphic operation information may be associated with the homomorphic operations to be performed on the ciphertext data. Thus, the homomorphic encryption processing server 100 may efficiently perform the homomorphic operations by reducing the usage of hardware resources included in the homomorphic encryption processing server 100.

Figure 2:
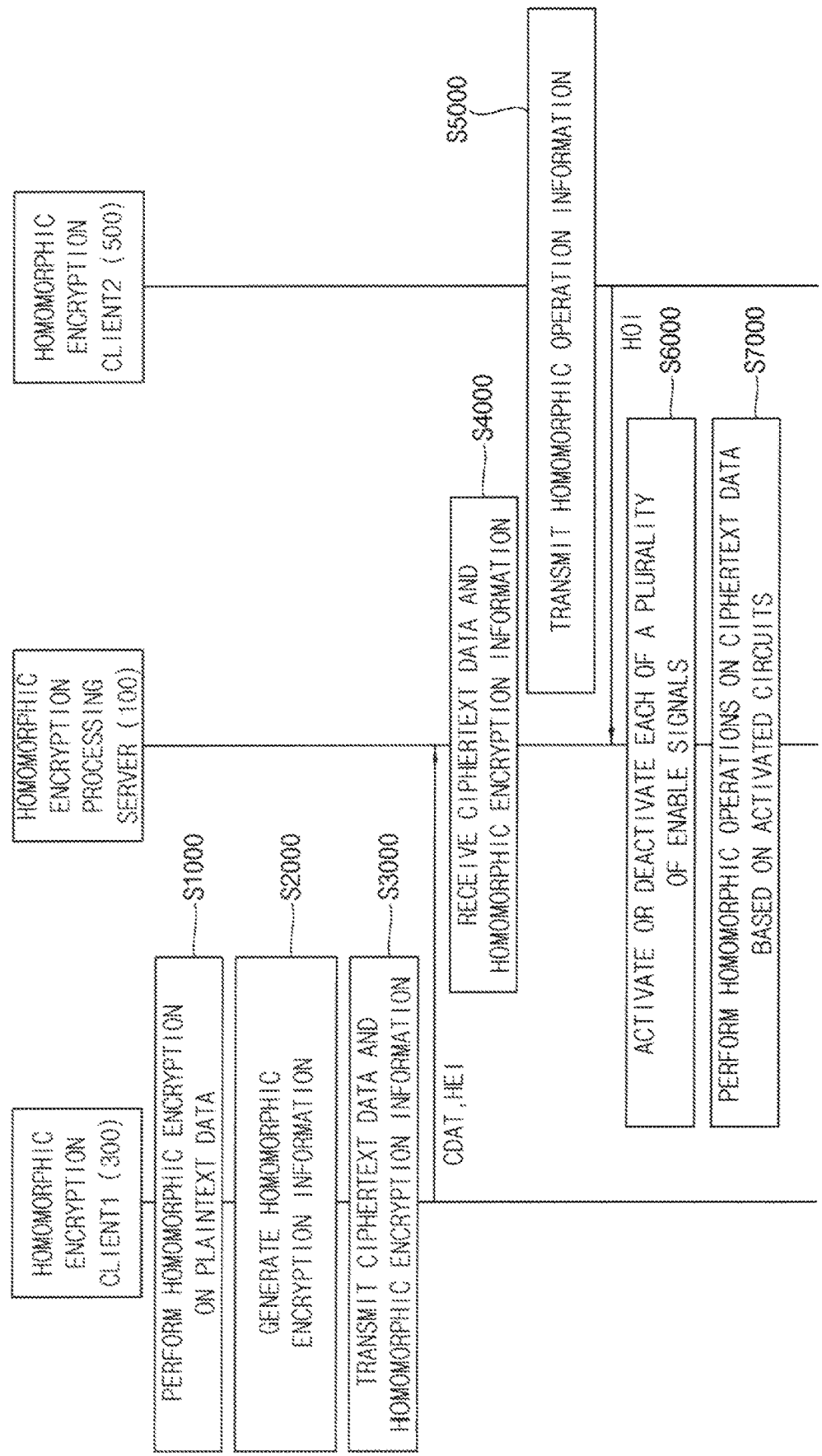
FIG. 2 is a flowchart illustrating a method of performing homomorphic operations according to one or more example embodiments.

FIG. 2 is a flowchart illustrating a method of performing homomorphic operations according to one or more example embodiments.

Referring to FIGS. 1 and 2, a first homomorphic encryption client 300 may perform homomorphic encryption on plaintext to generate ciphertext data (S1000). As described above with reference to FIG. 1, the ciphertext data may be generated by using one of various homomorphic encryption algorithms.

The first homomorphic encryption client 300 may generate the ciphertext data by performing homomorphic encryption on the plaintext data using one of the homomorphic encryption algorithms. In some example embodiments, the homomorphic encryption algorithm used to perform the homomorphic encryption may be predetermined between the homomorphic encryption client 300 and the homomorphic encryption processing server 100. In some example embodiments, according to an internet service policy provided by the homomorphic encryption processing server 100, a user of the first homomorphic encryption client 300 may download an application corresponding to the intern& service, may execute the application and may input the plaintext data while the application is being executed. According to an example embodiment, the application may be a predetermined application. In this case, the plaintext data input by the user of the first homomorphic encryption client 300 may be encrypted to the ciphertext data according to a specific homomorphic encryption algorithm by the application.

Figures 3, 4:
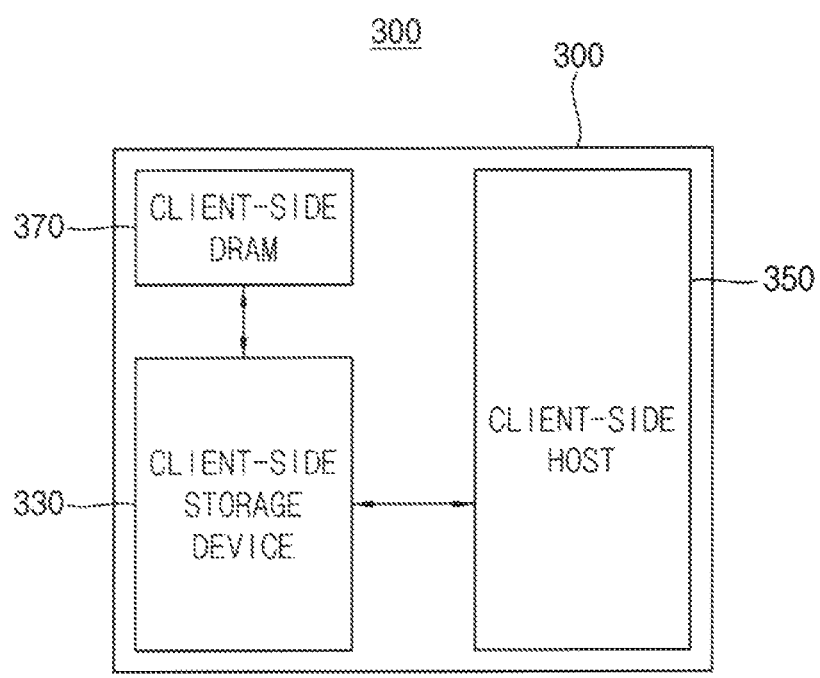
FIG. 3 is a diagram for describing types of homomorphic encryption algorithms.
FIG. 4 is a block diagram illustrating an example of a first homomorphic encryption client in FIG. 1.

FIG. 3 is a diagram for describing types of homomorphic encryption algorithms.

Referring to FIG. 3, first, second, third and fourth homomorphic encryption algorithms are Ring Learning With Errors (Ring-LWE) encryption algorithms capable of responding to quantum computer attacks, and each of the first, second, third and fourth homomorphic encryption algorithms may be classified according to a number system.

In some example embodiments, the first homomorphic encryption algorithm and the third homomorphic encryption algorithm may be based on an integer number system (INS), and the second homomorphic encryption algorithm and the fourth homomorphic encryption algorithm may be based on a complex number system (CNS). In some example embodiments, the first homomorphic encryption algorithm and the second homomorphic encryption algorithm may be based on a number system other than a residue number system (RNS), the third homomorphic encryption algorithm and the fourth homomorphic encryption algorithm may be based on the RNS.

In some example embodiments, the first homomorphic encryption algorithm may be a Brakerski/Fan-Vercauteren (BFV) algorithm, and the second homomorphic encryption algorithm may be a Homomorphic Encryption for Arithmetic of Approximate Numbers (HEAAN) algorithm. The third homomorphic encryption algorithm may be an RNS-BFV algorithm, and the fourth homomorphic encryption algorithm may be an RNS-HEAAN algorithm.

Hereinafter, it is assumed that the first homomorphic encryption client 300 uses one of the BFV algorithm, the HEAAN algorithm, the RNS-BFV algorithm and the RNS-HEAAN algorithm. However, example embodiments are not limited thereto. As such, according another example embodiment, the first homomorphic encryption client 300 may use another type of algorithm. The homomorphic encryption algorithms may include a partial homomorphic encryption algorithm, a somewhat homomorphic encryption algorithm and a fully homomorphic encryption algorithm. In the partial homomorphic encryption algorithm, a type of operations may be limited. In the somewhat homomorphic encryption algorithm, the number of operations may be limited as a length of data generated as a result of an operation increases exponentially as the operation is repeated. In the fully homomorphic encryption algorithm, the type of operations or the number of operations may not be limited.

Referring back to FIG. 2, the first homomorphic encryption client 300 may generate homomorphic encryption information. According to an example embodiment, the homomorphic encryption information may include a homomorphic encryption algorithm used to generate the ciphertext data (S2000). In some example embodiments, the homomorphic encryption information may represent whether the homomorphic encryption algorithm used to generate the ciphertext data is associated with any of the first to fourth homomorphic encryption algorithms. In some example embodiments, the homomorphic encryption information may include homomorphic encryption parameters used by the first homomorphic encryption client 300 in a process of generating the ciphertext data. The homomorphic encryption parameters may be different for each of the first homomorphic encryption algorithm, the second homomorphic encryption algorithm, the third homomorphic encryption algorithm and the fourth homomorphic encryption algorithm.

In some example embodiments, the homomorphic encryption information may be generated by the first homomorphic encryption client 300. In some example embodiments, the homomorphic encryption information may be generated by the homomorphic encryption processing server 100. That is, when a user of the homomorphic encryption client 300 downloads and executes a predetermined application corresponding to an internet service, the homomorphic encryption processing server 100 may generate the homomorphic encryption information according to a type of the application or a security level selected by the user in the application.

The first homomorphic encryption client 300 may transmit the ciphertext data (CDAT) and the homomorphic encryption information (HEI) to the homomorphic encryption processing server 100 (S3000).

The homomorphic encryption processing server 100 may receive the ciphertext data and the homomorphic encryption information (S4000). In some example embodiments, the homomorphic encryption processing server 100 may store the ciphertext data and the homomorphic encryption information corresponding to the ciphertext data in a storage device included in the homomorphic encryption processing server 100 until a request to perform homomorphic operations on the ciphertext data is received from the second homomorphic encryption client 500.

In some example embodiments, the number of the first homomorphic encryption client 300 may be plural. In this case, a user of each of the plurality of first homomorphic encryption clients 300 may be different, and a plurality of ciphertext data and homomorphic encryption information respectively corresponding to the plurality of ciphertext data may be transmitted from the plurality of first homomorphic encryption clients 300 to the homomorphic encryption processing server 100.

In some example embodiments, when the homomorphic encryption processing server 100 generates the homomorphic encryption information, a process of transmitting and receiving the homomorphic encryption information between the first homomorphic encryption client 300 and the homomorphic encryption processing server 100 in operations S3000 and S4000 may be omitted.

The second homomorphic encryption client 500 may transmit homomorphic operation information (HOI) to the homomorphic encryption processing server 100 (S5000). The homomorphic operation information may be associated with homomorphic operations to be performed on the ciphertext data. According to an example embodiment, the second homomorphic encryption client 500 may transmit homomorphic operation information to the homomorphic encryption processing server 100 after the homomorphic encryption processing server 100 receives the ciphertext data (CDAT) and the homomorphic encryption information (HEI) from the first homomorphic encryption client 300.

In some example embodiments, the homomorphic operation may include a homomorphic addition and a homomorphic multiplication. The homomorphic operation information may include logical or temporal information for sequentially performing the homomorphic addition or the homomorphic multiplication.

In some example embodiments, the homomorphic operation information may include information on a process including a series of operation processes in which the homomorphic addition or the homomorphic multiplication is sequentially or repeatedly performed. For example, when the process is a deep learning process, the homomorphic operation information may include information about timing of each of the homomorphic addition or the homomorphic multiplication that is repeatedly performed every period in the deep learning process. According to an example embodiment, the period may be a predetermined time period.

The homomorphic encryption processing server 100 may activate or deactivate each of a plurality of enable signals applied to a plurality of circuits included in the homomorphic encryption processing server 100 based on the homomorphic encryption information and the homomorphic operation information (S6000). The homomorphic encryption processing server 100 may activate or deactivate each of the plurality of circuits based on the plurality of enable signals. The homomorphic encryption processing server 100 may perform the homomorphic operations on the ciphertext data based on activated circuits among the plurality of circuits (S7000).

The homomorphic encryption processing server 100 may perform the homomorphic operations based on the plurality of circuits. In some example embodiments, the homomorphic encryption processing server 100 may generate a plurality of enable signals capable of selectively deactivating all or a portion of the plurality of circuits. The homomorphic encryption processing server 100 may deactivate a portion of the plurality of circuits by applying the plurality of enable signals to the portion of the plurality of circuits.

In some example embodiments, the portion of the circuits that are deactivated among the plurality of circuits may be circuits that are not used in a process of performing homomorphic operations based on the homomorphic encryption information and the homomorphic operation information. For example, the homomorphic information may be associated with one of the first to fourth homomorphic encryption algorithms, and the homomorphic operation information may be associated with one of the homomorphic addition and the homomorphic multiplication.

When the homomorphic encryption information is associated with the first or the second homomorphic encryption algorithm, all or a portion of the circuits used in a process of performing RNS-based homomorphic operations among the plurality of circuits may be deactivated. When the homomorphic operation information is associated with the homomorphic addition, all or a portion of the circuits used in a process of performing the homomorphic multiplication may be deactivated.

FIG. 4 is a block diagram illustrating an example of a first homomorphic encryption client in FIG. 1.

Referring to FIGS. 1 and 4, a first homomorphic encryption client 300 may include a client-side storage device 330, a client-side host 350 and a client-side dynamic random access memory (DRAM) 370. In some example embodiments, the client-side storage device 330 may include a storage controller and a memory device.

The client-side host 350 may control the client-side storage device 330, and the storage controller may control the client-side DRAM 370 and the memory device under a control of the client-side host 350.

As described above with reference to FIGS. 1 and 2, the first homomorphic encryption client 300 may generate ciphertext data by performing homomorphic encryption on the plaintext data. In some example embodiments, the ciphertext data may be generated by executing an application downloaded and installed in the first homomorphic encryption client 300 to perform homomorphic encryption on the plaintext data.

The plaintext data may be input from outside by a user of the first homomorphic encryption client 300 and may be stored in the memory device or the client-side DRAM 370. The application may be downloaded from outside and may be stored in the memory device or the client-side DRAM 370.

Figure 5:
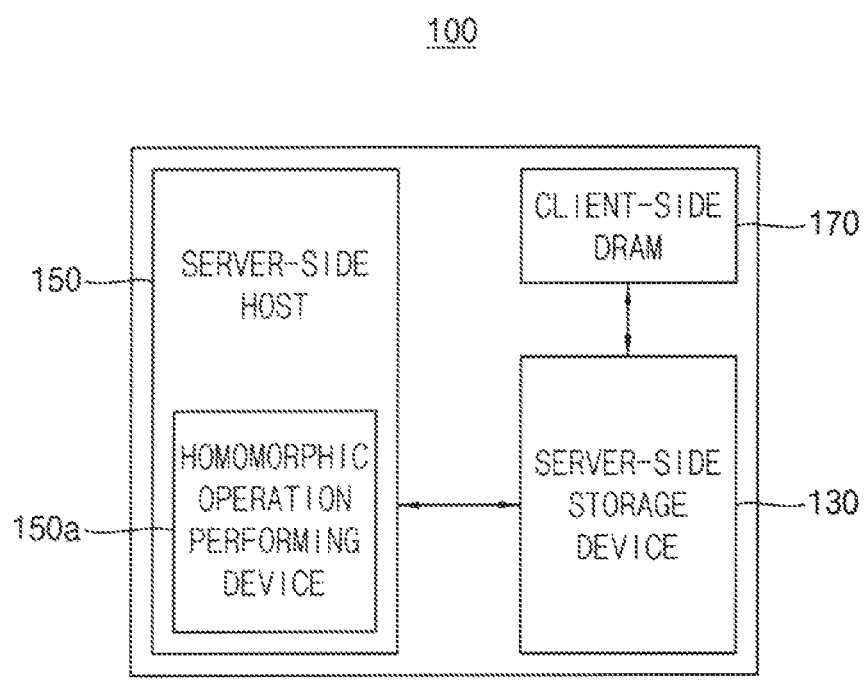
FIG. 5 is a block diagram illustrating an example of a homomorphic encryption processing server in FIG. 1.

FIG. 5 is a block diagram illustrating an example of a homomorphic encryption processing server in FIG. 1.

Referring to FIGS. 1 and 5, a homomorphic encryption processing server 100 may include a server-side storage device 130, a server-side host 150 and a server-side DRAM 170. In some example embodiments, the server-side storage device 130 may include a storage controller and a memory device.

The server-side host 150 may control the server-side storage device 130 and the storage controller may control the server-side DRAM 170 and the memory device under a control of the server-side host 150.

As described above with reference to FIGS. 1 and 2, the homomorphic encryption processing server 100 may receive homomorphic encryption information and ciphertext data from the first homomorphic encryption client 300 and may receive homomorphic operation information from the second homomorphic encryption client 500. In some example embodiments, the server-side host 150 may include a homomorphic operation performing device 150a, and the homomorphic operation performing device 150a may include a plurality of circuits. The homomorphic operation performing device 150a may perform homomorphic operations using the plurality of circuits. Hereinafter, the homomorphic operation performing device 150a will be described in detail.

Figure 6:
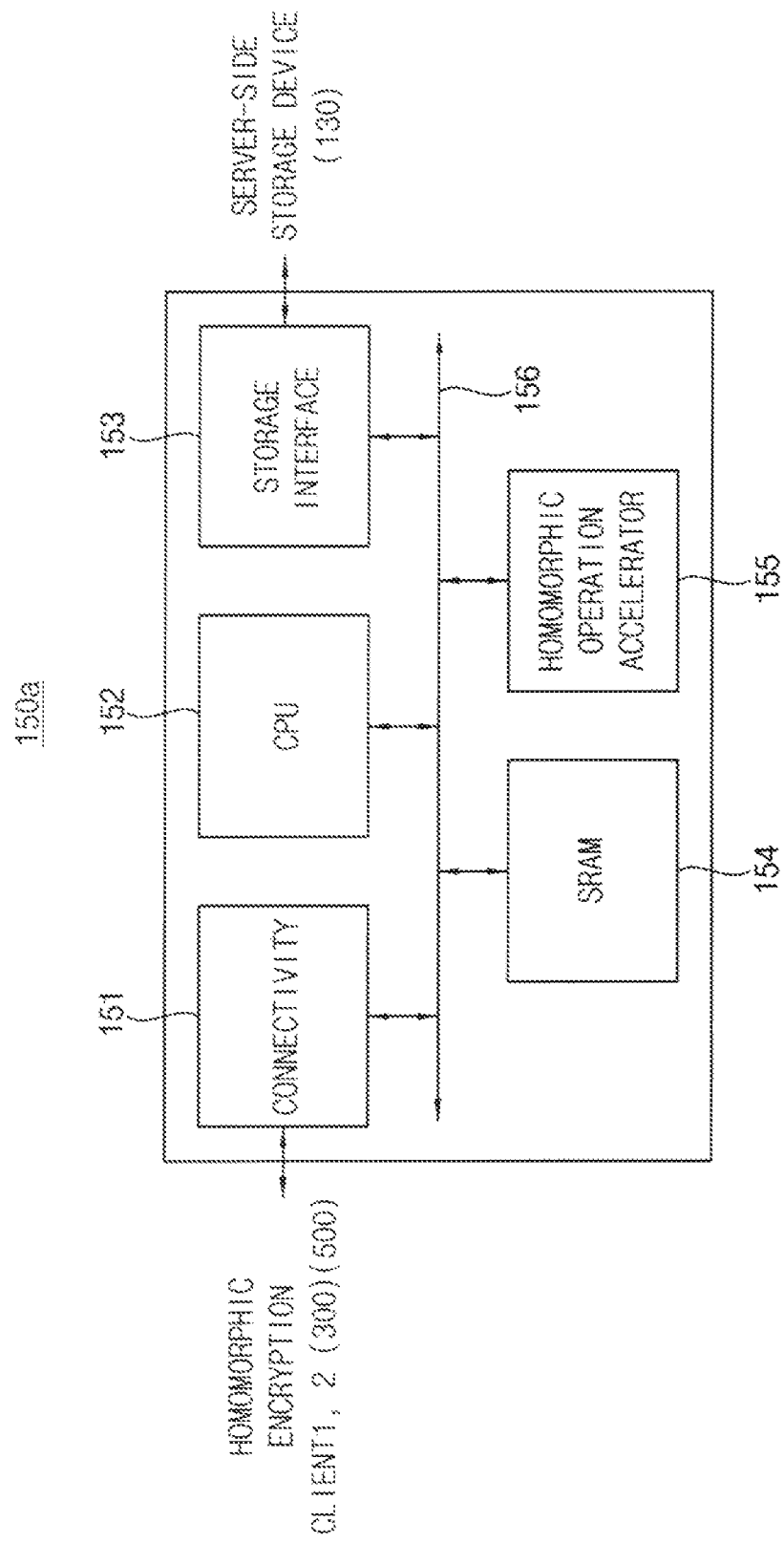
FIG. 6 is a block diagram illustrating an example of a homomorphic operation performing device in FIG. 5.
Figure 7:
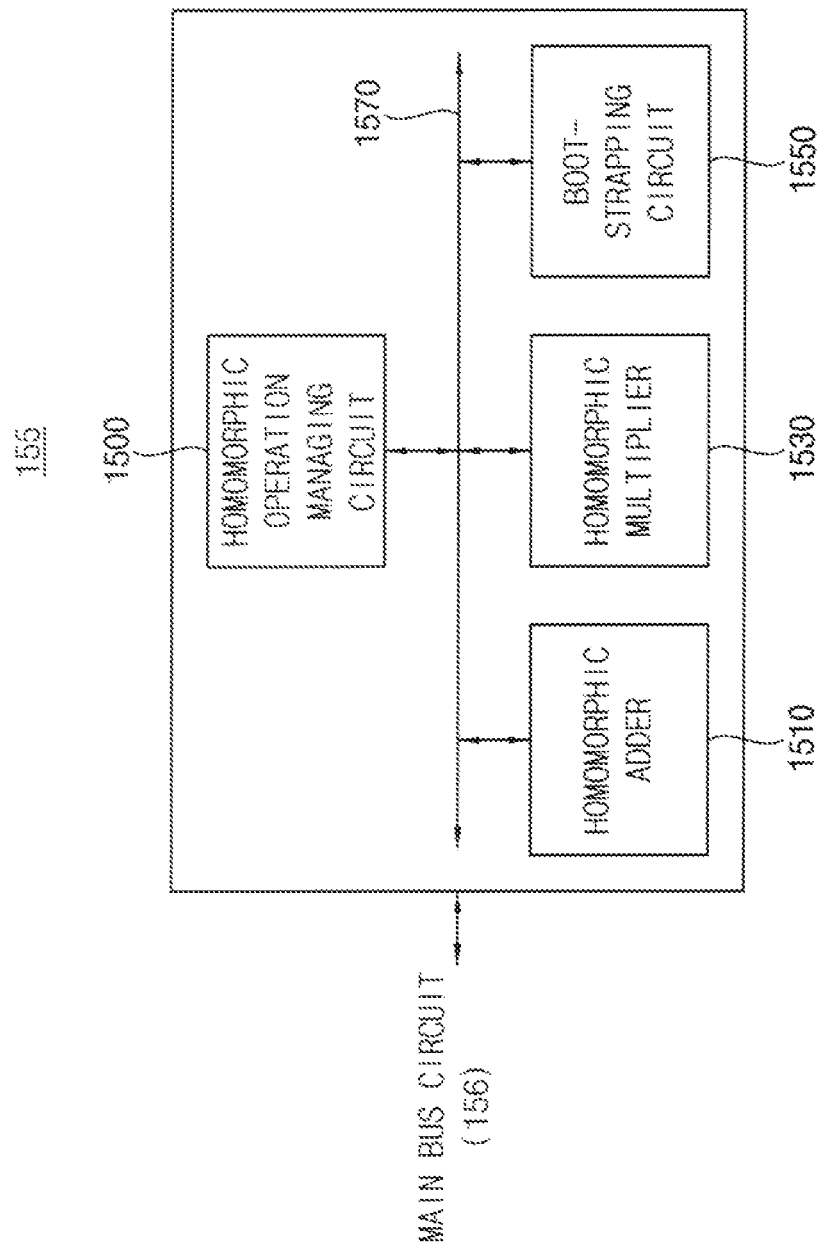
FIG. 7 is a block diagram illustrating an example of a homomorphic operation accelerator in FIG. 6.

FIG. 6 is a block diagram illustrating an example of a homomorphic operation performing device in FIG. 5. FIG. 7 is a block diagram illustrating an example of a homomorphic operation accelerator in FIG. 6.

Referring to FIG. 6, a homomorphic operation performing device 150a may include a communication interface CONNECTIVITY 151, a central processing unit (CPU) 152, a storage interface 153, a static random access memory (SRAM) 154, a homomorphic operation accelerator 155 and a main bus circuit 156. According to an example embodiment, the communication interview 151 may include a communication circuit.

The CPU 152 may control an overall operation of components such as the communication interface 151, the storage interface 153, the SRAM 154, the homomorphic operation accelerator 155 and the main bus circuit 156 included in the homomorphic operation performing device 150a. The components such as the communication interface 151, the CPU 152, the storage interface 153, the SRAM 154 and the homomorphic operation accelerator 155 may transmit or receive data through the main bus circuit 156.

The homomorphic operation performing device 150a may communicate with the first homomorphic encryption client 300 and the second homomorphic encryption client 500 through the communication interface 151, and may communicate with the server-side storage device 130 through the storage interface 153.

The homomorphic operation accelerator 155 may perform homomorphic operations on ciphertext data. In some example embodiments, the homomorphic operation accelerator 155 may include a plurality of circuit for performing the homomorphic operations.

Referring to FIG. 7, a homomorphic operation accelerator 155 may include a homomorphic operation managing circuit 1500, a homomorphic adder 1510, a homomorphic multiplier 1530, a bootstrapping circuit 1550 and a first sub-bus circuit 1570. In FIG. 7, the homomorphic operation accelerator 155 is illustrated as including a plurality of components 1500, 1510, 1530 and 1550, but this is merely exemplary. In some example embodiments, the homomorphic operation accelerator 155 may further include additional components necessary to perform homomorphic operations.

The homomorphic operation managing circuit 1500 may control the homomorphic adder 1510, the homomorphic multiplier 1530 and the bootstrapping circuit 1550 through the first sub-bus circuit 1570. In some example embodiments, the homomorphic operation managing circuit 1500 may receive ciphertext data, homomorphic encryption information and homomorphic operation information through the main bus circuit 156 illustrated in FIG. 6.

The homomorphic operation managing circuit 1500 may perform one of a homomorphic addition, a homomorphic multiplication and a bootstrapping by controlling one of the homomorphic adder 1510, the homomorphic multiplier 1530 and the bootstrapping circuit 1550 based on the homomorphic encryption information and the homomorphic operation information. Hereinafter, the homomorphic multiplier 1530 will be described in detail.

Figure 8:
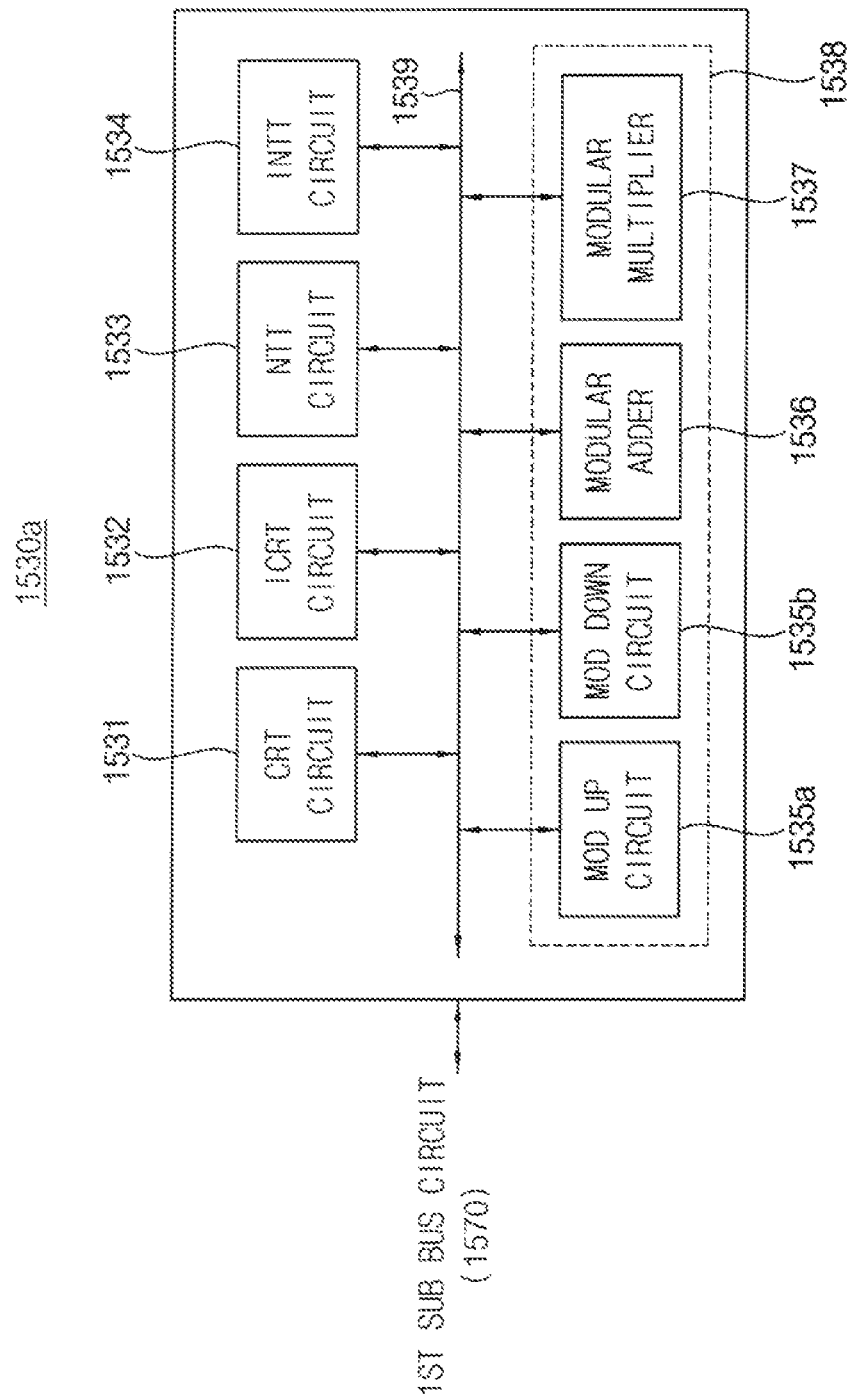
FIG. 8 is a block diagram illustrating an example of a homomorphic multiplier in FIG. 7.

FIG. 8 is a block diagram illustrating an example of a homomorphic multiplier in FIG. 7.

Referring to FIG. 8, a homomorphic multiplier 1530a may include a Chinese remainder theorem (CRT) circuit 1531, an inverse CRT circuit 1532, a number theoretic transform (NTT) circuit 1533, an inverse NTT circuit 1534, a modular shift up (MOD UP) circuit 1535a, a modular shift down (MOD DOWN) circuit 1535b, a modular adder 1536, a modular multiplier 1537 and a second sub-bus circuit 1539.

In some example embodiments, the CRT circuit 1531 may perform an operation that applies the Chinese remainder theorem to input data, and the inverse CRT circuit 1532 may perform an operation inverse or opposite to that of the CRT circuit 1531. The NTT circuit 1533 may perform a Fourier operation on input data in an integer system, and the inverse NTT circuit 1534 may perform an operation inverse or opposite to that of the NTT circuit 1533. The modular shift up circuit 1535a may perform a modular operation for increasing the number of digits in units of bits on input data, the modular shift down circuit 1535b may perform a modular operation for decreasing the number of digits in units of bits on input data. The modular adder 1536 may perform a modular addition operation on input data, and the modular multiplier 1537 may perform a modular multiplication operation on input data.

In some example embodiments, the modular shift up circuit 1535a, the modular shift down circuit 1535b, the modular adder 1536 and the modular multiplier 1538 may configure a key switching circuit 1538.

In some example embodiments, the homomorphic multiplier 1530a may perform homomorphic multiplication under a control of the homomorphic operation managing circuit 1500 as described above with reference to FIG. 7. The homomorphic operation managing circuit 1500 may activate or deactivate a plurality of enable signals that activate or deactivate each of the CRT circuit 1531, the ICRT circuit 1532, the NTT circuit 1533, the INTT circuit 1534, the MOD UP circuit 1535a, the MOD DOWN circuit 1535b, the MODULAR ADDER 1536, the MODULAR MULTIPLIER 1537 and the key switching circuit 1538 included in the homomorphic multiplier 1530a. The homomorphic operation managing circuit 1500 may apply the plurality of enable signals to the CRT circuit 1531, the ICRT circuit 1532, the NTT circuit 1533, the INTT circuit 1534, the MOD UP circuit 1535a, the MOD DOWN circuit 1535b, the MODULAR ADDER 1536, the MODULAR MULTIPLIER 1537 and the key switching circuit 1538 included in the homomorphic multiplier 1530a, respectively.

The homomorphic operation managing circuit 1500 may activate or deactivate each of the CRT circuit 1531, the ICRT circuit 1532, the NTT circuit 1533, the INTT circuit 1534, the MOD UP circuit 1535a, the MOD DOWN circuit 1535b, the MODULAR ADDER 1536, the MODULAR MULTIPLIER 1537 and the key switching circuit 1538 based on the homomorphic encryption information and the homomorphic operation information.

For example, when the homomorphic operations correspond to a homomorphic addition, the homomorphic operation managing circuit 1500 may deactivate the CRT circuit 1531, the inverse CRT circuit 1532, the NTT circuit 1533, the inverse NTT circuit 1534, the modular shift up circuit 1535a, the modular shift down circuit 1535b, the modular adder 1536 and the modular multiplier 1537.

For example, when the homomorphic operations correspond to a homomorphic multiplication and the homomorphic encryption algorithm is based on a RNS, e.g., RNS-BFV algorithm or RNS-HEAAN algorithm, the homomorphic operation managing circuit 1500 may deactivate the CRT circuit 1531 and the inverse CRT circuit 1532 and may activate the NTT circuit 1533, the inverse NTT circuit 1534, the modular shift up circuit 1535a, the modular shift down circuit 1535b, the modular adder 1536 and the modular multiplier 1537.

For example, when the homomorphic operations correspond to a homomorphic multiplication and the homomorphic encryption algorithm is based on a number system other than the RNS, the homomorphic operation managing circuit 1500 may activate the CRT circuit 1531, the inverse CRT circuit 1532, the NTT circuit 1533, the inverse NTT circuit 1534, the modular shift up circuit 1535a, the modular shift down circuit 1535b, the modular adder 1536 and the modular multiplier 1537.

Figure 9:
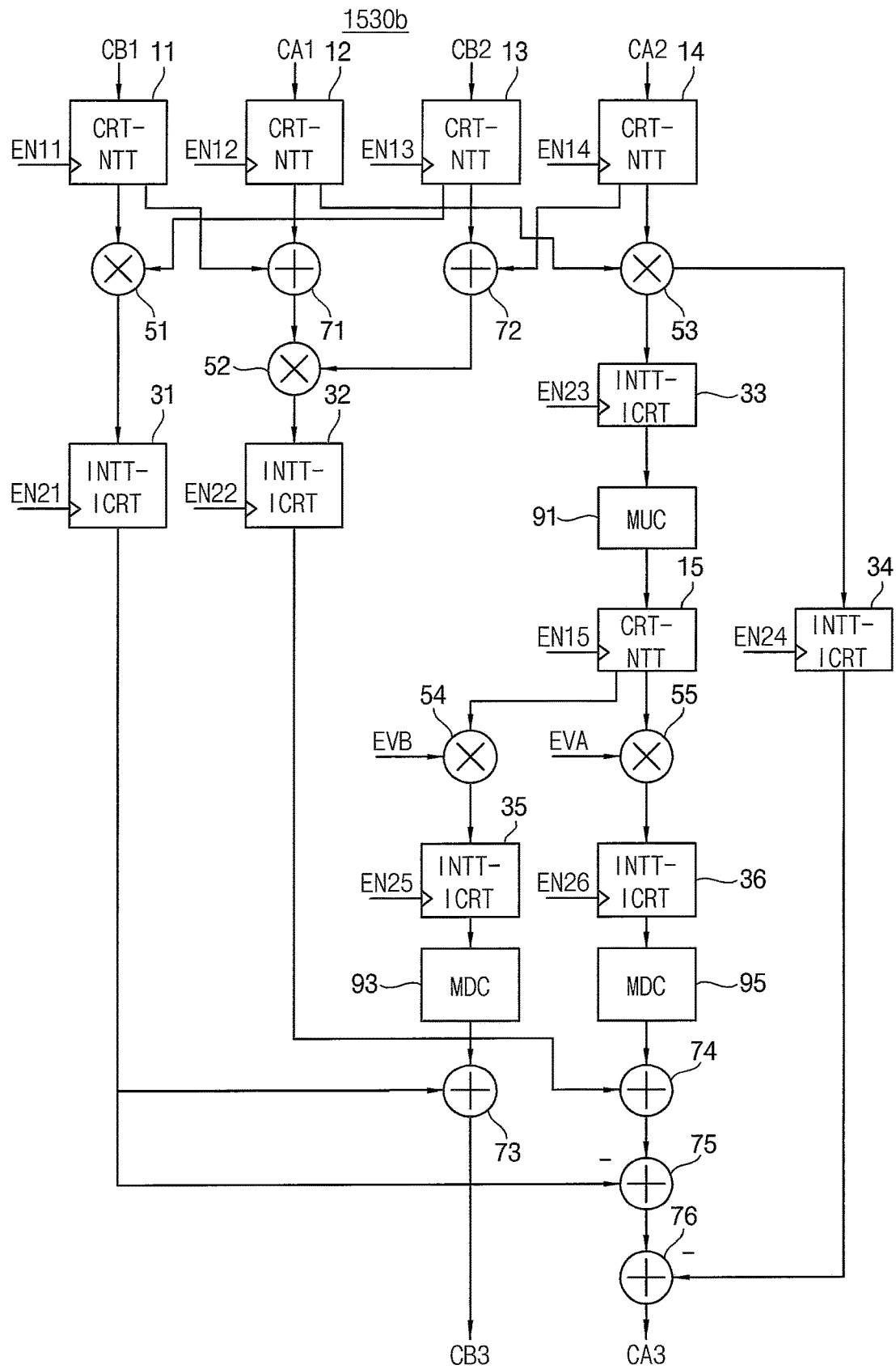
FIG. 9 is a block diagram illustrating another example of a homomorphic multiplier in FIG. 7.

FIG. 9 is a block diagram illustrating an example of a homomorphic multiplier in FIG. 7.

In FIG. 9, a homomorphic multiplier 1530b of performing homomorphic multiplication according to a HEAAN algorithm as a homomorphic encryption algorithm is illustrated. As described above with reference to FIG. 1, the HEAAN algorithm is based on a complex number system and corresponds to an algorithm that is based on a number system other than a RNS.

Referring to FIG. 9, the homomorphic multiplier 1530b may receive first ciphertexts CA1 and CB1 and second ciphertexts CA2 and CB2. The homomorphic multiplier 1530b may perform homomorphic multiplication on the first ciphertexts CA1 and CB1 and the second ciphertexts CA2 and CB2, and may output a resulting ciphertexts CA3 and CB3 as a result of performing the homomorphic multiplication.

The homomorphic multiplier 1530b may include a plurality of CRT-NTT circuits 11, 12, 13, 14 and 15, a plurality of INTT-ICRT circuits 31, 32, 33, 34, 35 and 36, a plurality of modular multipliers 51, 52, 53, 54 and 55, a plurality of modular adders 71, 72, 73, 74, 75 and 76, a modular shift up circuit MUC 91 and a plurality of modular shift down circuits 93 and 95.

In some example embodiments, each of the plurality of CRT-NTT circuits 11, 12, 13, 14 and 15 may correspond to the CRT circuit 1531 and the NTT circuit 1533 described above with reference to FIG. 8, and each of the plurality of INTT-ICRT circuits 31, 32, 33, 34, 35 and 36 may correspond to the inverse NTT circuit 1534 and the inverse CRT circuit 1532 described above with reference to FIG. 8. Each of the plurality of modular multipliers 51, 52, 53, 54 and 55 may correspond to the modular multiplier 1537 described above with reference to FIG. 8, and each of the plurality of modular adders 71, 72, 73, 74, 75 and 76 may correspond to the modular adder 1536 described above with reference to FIG. 8. A modular shift up circuit 91 may correspond to the modular shift up circuit 1535a described above with reference to FIG. 8, and each of the plurality of modular shift down circuits 93 and 95 may correspond to the modular shift down circuit 1535b described above with reference to FIG. 8.

In some example embodiments, each of the plurality of CRT-NTT circuits 11, 12, 13, 14 and 15 may perform a CRT operation, and then perform an NTT operation on results generated by performing the CRT operation. Each of the plurality of INTT-ICRT circuits 31, 32, 33, 34, 35 and 36 may perform an INTT operation and then perform an ICRT operation on results generated by performing the INTT operation.

Each of the plurality of modular multipliers 51, 52, 53, 54 and 55 may perform a modular multiplication operation, and each of the plurality of modular adders 71, 72, 73, 74, 75 and 76 may perform a modular addition operation. The modular shift up circuit 91 may perform a modular shift up operation, and each of the modular shift down circuits 93 and 95 may perform a modular shift down operation.

In some example embodiments, each of the modular shift up circuit 91 and the modular shift down circuits 93 and 95 may further perform modulus adjustments or basis conversions that are based on new coprime on ciphertext data according to the homomorphic encryption algorithm.

Each of the plurality of CRT-NTT circuits 11, 12, 13, 14 and 15 may be configured by sequentially arranging and connecting the CRT circuit 1531 and the NTT circuit 1533 described above with reference to FIG. 8, and each of the plurality of INTT-ICRT circuits 31, 32, 33, 34, 35 and 36 may be configured by sequentially arranging and connecting the inverse NTT circuit 1534 and the inverse CRT circuit 1532 described above with reference to FIG. 8.

As described above with reference to FIG. 9, the homomorphic operation managing circuit 1500 may generate a plurality of enable signals EN11, EN12, EN13, EN14, EN15, EN21, EN22, EN23, EN24, EN25 and EN26 that activate or deactivate a portion of components included in the homomorphic multiplier 1530b. In FIG. 9, it is illustrated that the plurality of enable signals EN11, EN12, EN13, EN14, EN15, EN21, EN22, EN23, EN24, EN25 and EN26 may activate or deactivate only the plurality of CRT-NTT circuits 11, 12, 13, 14 and 15 and the plurality of INTT-ICRT circuits 31, 32, 33, 34, 35 and 36, but this is merely exemplary and the disclosure is not limited thereto. As such, in some example embodiments, the plurality of modular multipliers 51, 52, 53, 54 and 55, the plurality of modular adders 71, 72, 73, 74, 75 and 76, the modular shift up circuit 91 and the plurality of modular shift down circuits 93 and 95 may also be activated or deactivated by separate enable signals generated by the homomorphic operation managing circuit 1500.

In some example embodiments, the homomorphic operation managing circuit 1500 may activate or deactivate all or some of components 11, 12, 13, 14, 15, 31, 32, 33, 34, 35, 36, 51, 52, 53, 53, 55, 71, 72, 73, 74, 75, 76, 91, 93 and 95.

For example, when the homomorphic operations correspond to a homomorphic addition, the homomorphic operation managing circuit 1500 may deactivate all of components 11, 12, 13, 14, 15, 31, 32, 33, 34, 35, 36, 51, 52, 53, 53, 55, 71, 72, 73, 74, 75, 76, 91, 93 and 95.

For example, when the homomorphic operations correspond to a homomorphic multiplication and the homomorphic encryption algorithm is based on a RNS, e.g., RNS-BFV algorithm or RNS-HEAAN algorithm, the homomorphic operation managing circuit 1500 may deactivate only a plurality of CRT-NTT circuits 11, 12, 13, 14 and 15 and a plurality of INTT-ICRT circuits 31, 32, 33, 34, 35 and 36.

For example, when the homomorphic operations correspond to a homomorphic multiplication and the homomorphic encryption algorithm is based on a number system other than the RNS, the homomorphic operation managing circuit 1500 may activate all of components 11, 12, 13, 14, 15, 31, 32, 33, 34, 35, 36, 51, 52, 53, 53, 55, 71, 72, 73, 74, 75, 76, 91, 93 and 95.

Figure 10:
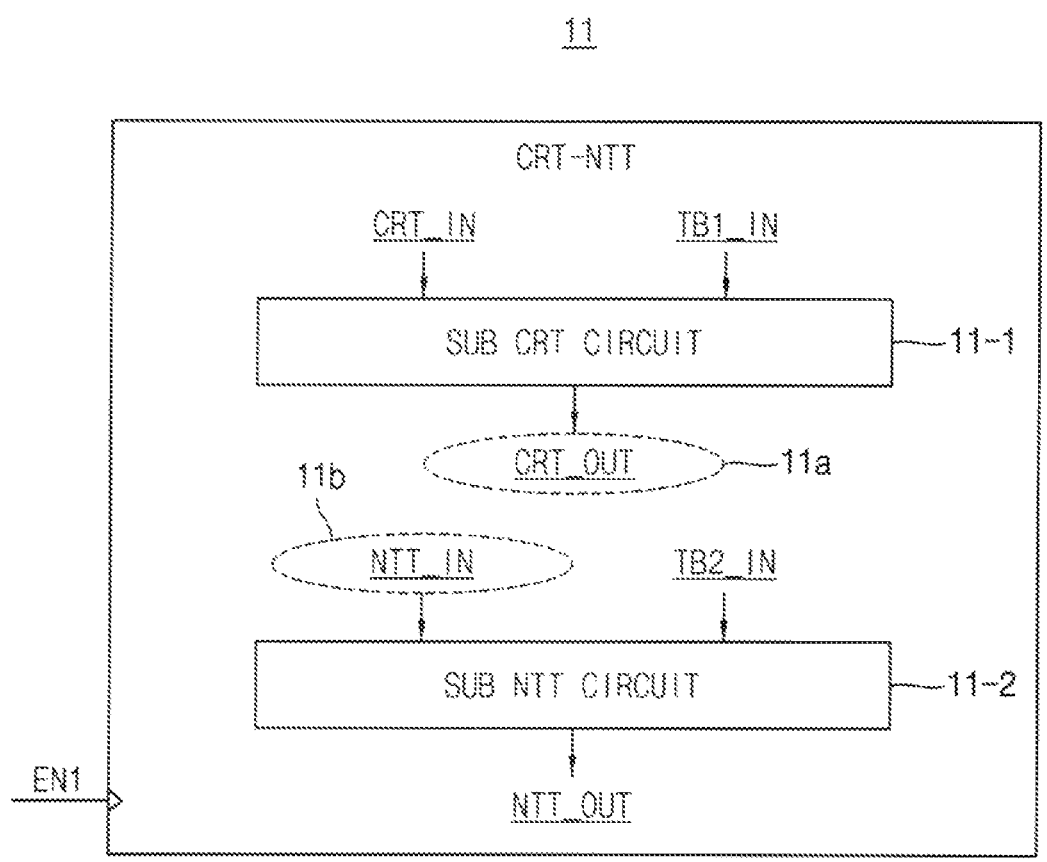
FIG. 10 is a block diagram illustrating an example of a first CRT-NTT circuit in FIG. 9.

FIG. 10 is a block diagram illustrating an example of a first CRT-NTT circuit in FIG. 9.

In FIG. 10, a first CRT-NTT circuit 11 of the plurality of CRT-NTT circuits 11, 12, 13 and 14 in FIG. 9 is illustrated. Referring to FIG. 10, the first CRT-NTT circuit 11 may include a sub CRT circuit 11-1 and a sub NTT circuit 11-2.

The sub CRT circuit 11-1 may receive a first CRT input signal CRT_IN and a second CRT input signal TB1_IN, perform a CRT operation based on the first CRT input signal CRT_IN and the second CRT input signal TB1_IN, and output a CRT result signal CRT_OUT 11a. The sub NTT circuit 11-2 may receive a first NTT input signal NTT_IN 11b and a second NTT input signal TB2_IN, perform a NTT operation based on the first NTT input signal NTT_IN 11b and the second NTT input signal TB2_IN, and output a NTT result signal NTT_OUT. In this case, each of the CRT result signal 11a output from the sub CRT circuit 11-1 and the first NTT input signal 11b input to the sub NTT circuit 11-2 may be two-dimensional matrix data having a matrix form. The two-dimensional data of each of the CRT result signal 11a and the first NTT input signal 11b may be in a transposed relationship. That is, the first NTT input signal 11b may be transpose matrix data of the CRT result signal 11a.

FIG. 11 is a diagram for describing an example of a CRT operation performed in a first CRT-NTT circuit in FIG. 9.

Referring to FIGS. 10 and 11, a CRT algorithm may perform a CRT operation based on a first CRT input signal CRT_IN and a second CRT input signal TB1-IN, and output a CRT result signal CRT_OUT 11a.

In a process of performing the CRT operation, a plurality of loops may operate. A first loop may perform repeated operations based on a first index variable 'i', a second loop may perform repeated operations based on a second index variable 'j', and a third loop may perform repeated operations based on a third index variable 'k'.

In some example embodiments, a multiplication operation is performed between a component CRT_IN[i][k] of the first CRT input signal and a component TB1_IN[j][k] of the second CRT input signal in the third loop. Then, the result of the multiplication operation is cumulatively added to a local variable, e.g., 'A'. As the third index variable 'k' based on the third loop is increased from '0' to 'N3-1', a result of performing a modular operation between the local variable and the prime number p[j] based on the second index variable 'j' is output as a component CRT_OUT[i][j] of the CRT result signal.

In some example embodiments, as the second index variable 'j' increases from '0' to 'N2-1', a result of performing a modular operation based on each of the plurality of prime numbers p[j] is sequentially output as CRT result signals CRT_OUT[i][j].

As described above with reference to FIG. 10, the first NTT input signal corresponds to transposed matrix data of the CRT result signal. Accordingly, by changing a order in which the CRT result signals are output, when CRT result signals corresponding to a first prime number among a plurality of prime numbers are output first and then CRT result signals corresponding to a second prime number different from the first prime number be sequentially output, the CRT result signals CRT_OUT[i][j] may be directly input to the sub NTT circuit as first NTT input signals.

FIG. 12 is a diagram for describing a process of selectively deactivating a key switching circuit in FIG. 8 by a homomorphic operation managing circuit in FIG. 7.

According to an example embodiment as illustrated in FIG. 12, first to fourth key switching circuits provided corresponding to each of first to fourth homomorphic encryption algorithms. For example, although FIG. 8 illustrates one key switching circuit 1538, according to another example embodiment, the homomorphic multiplier may include a plurality of key switching circuits. Referring to FIG. 12, the first key switching circuit may correspond to the first homomorphic encryption algorithm, and the second key switching circuit may correspond to the second homomorphic encryption algorithm. The third key switching circuit may correspond to the third homomorphic encryption algorithm, and the fourth key switching circuit may correspond to the fourth homomorphic encryption algorithm.

More specifically, as described above with reference to FIGS. 8 and 9, the key switching circuit 1538 may include the modular shift up circuit 91, the modular shift down circuits 93 and 95, the modular adder 1536 and the modular multiplier 1538. For example, when the key switching circuit 1538 corresponds to a key switching circuit according to HEAAN algorithm, the key switching circuit 1538 may be implemented based on the plurality of modular multipliers 54 and 55, the plurality of CRT-NTT circuits 11, 12, 13, 14 and 15, the plurality of INT-ICRT circuits 35 and 36, the modular shift up circuit 91, the plurality of modular shift down circuits 93 and 95 and the plurality of adders 73, 74, 75 and 76 in FIG. 9.

In some example embodiments, the first to fourth key switching circuits corresponding to the first to fourth homomorphic encryption algorithms may be individually implemented in the homomorphic multiplier 1530b of FIG. 9. In this case, the homomorphic operation managing circuit 1500 in FIG. 7 may deactivate remaining key switching circuits, e.g. second to fourth key switching circuits, except for a key switching circuit, e.g., the first key switching circuit, corresponding to one of the first to fourth homomorphic encryption algorithms based on the homomorphic encryption information. That is, the homomorphic operation managing circuit 1500 may activate the first key switching and may deactivate the second to the fourth key switching circuits.

Figure 13:
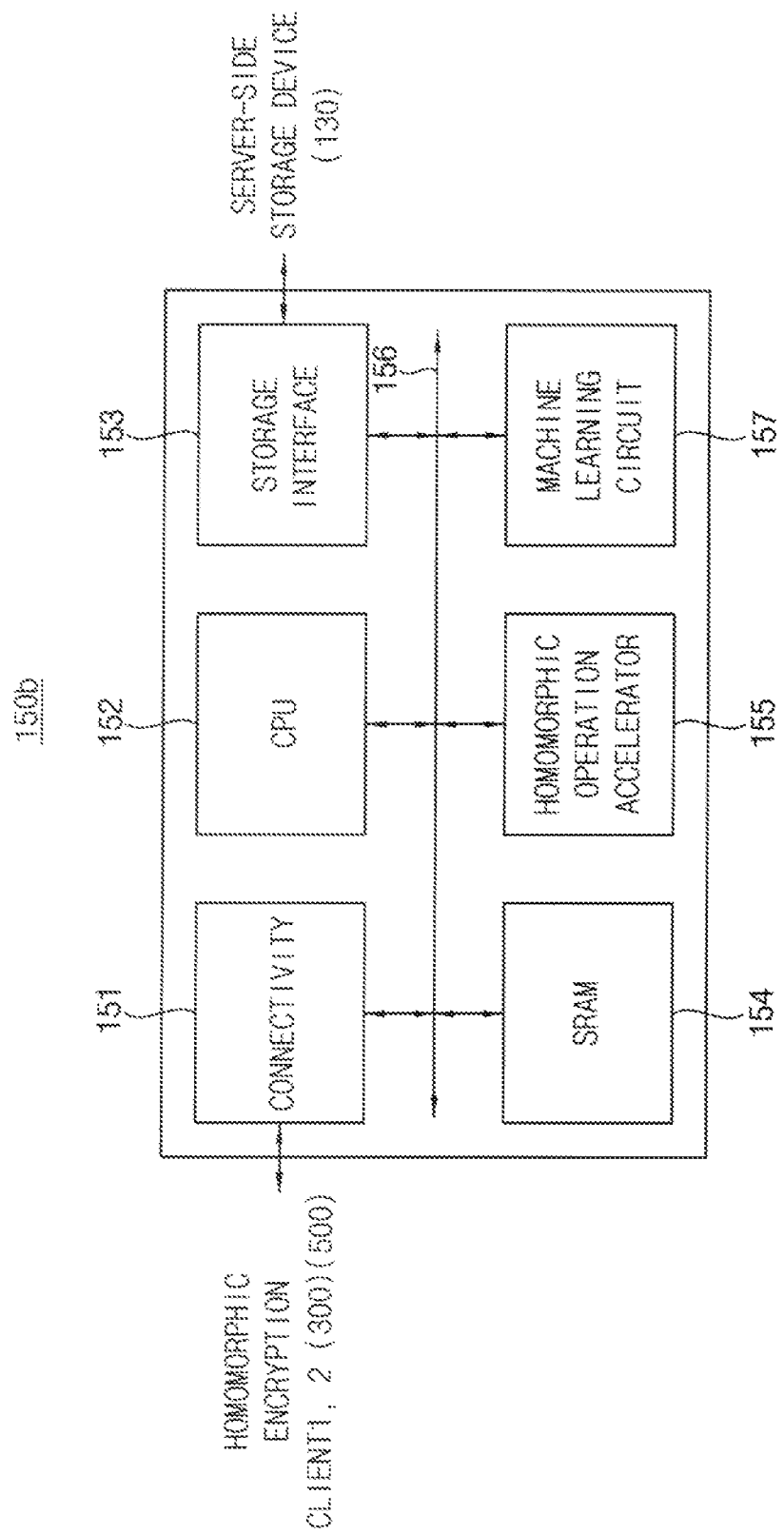
FIG. 13 is a block diagram illustrating another example of a homomorphic operation performing device in FIG. 5.

FIG. 13 is a block diagram illustrating an example of a homomorphic operation performing device in FIG. 5.

According to an example embodiment, a homomorphic operation performing device 150b may further include a machine learning circuit 157 compared to a homomorphic operation performing device 150a in FIG. 6, and thus detailed descriptions of redundant components will be omitted. Referring to FIG. 13, the machine learning circuit 157 may perform deep learning.

In some example embodiments, the homomorphic operation performing device 150b may receive ciphertext data and homomorphic encryption information from the first homomorphic encryption client 300 and receive homomorphic operation information from the second homomorphic encryption client 500.

As described above with reference to FIG. 2, the homomorphic operation information may include information on a process including a series of operation processes in which the homomorphic addition or the homomorphic multiplication is sequentially or repeatedly performed. That is, when a portion of a plurality of circuits included in the homomorphic operation performing device 150b are selectively deactivated based on the ciphertext data and the homomorphic encryption information, it is possible to efficiently perform a process of sequentially or repeatedly performing the homomorphic addition or the homomorphic multiplication based on activated circuits among the plurality of circuits.

Figure 14:
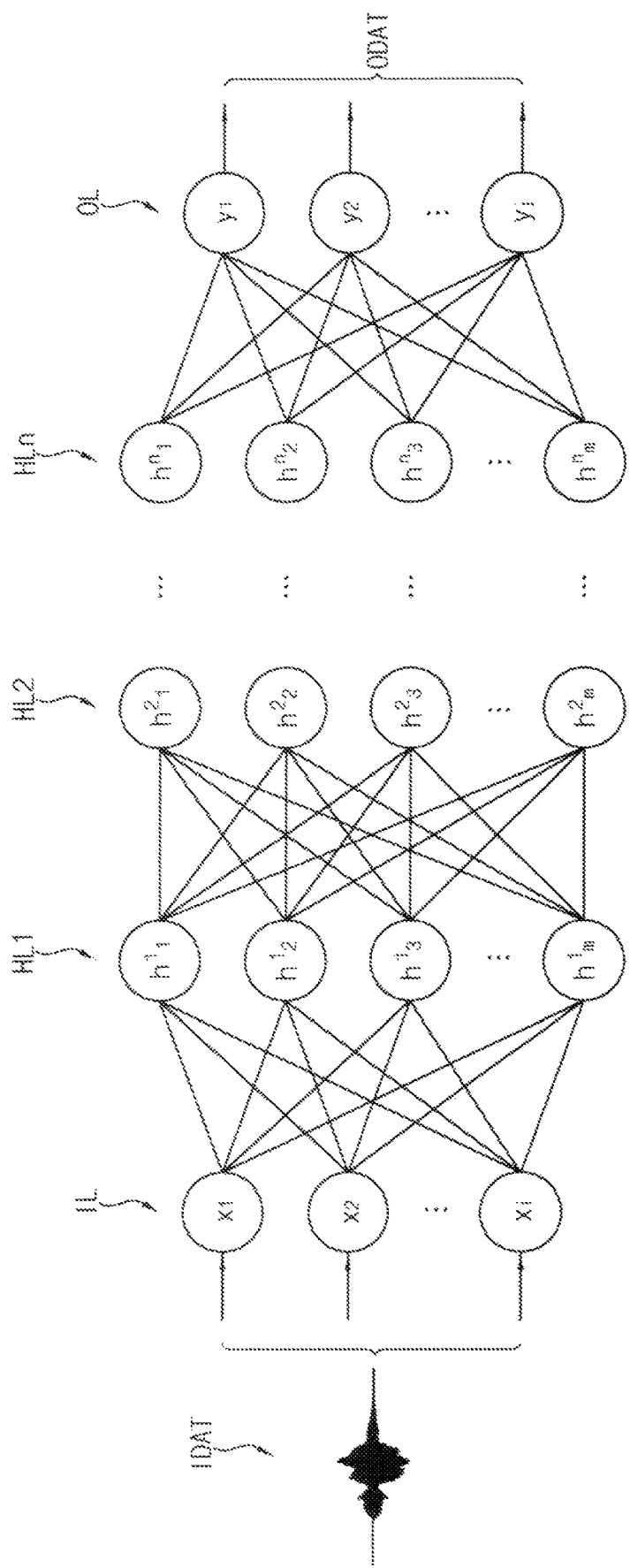
FIGS. 14, 15 and 16 are diagrams for describing an example of a network structure used to perform deep learning by a homomorphic operation performing device according to one or more example embodiments.
Figure 15:
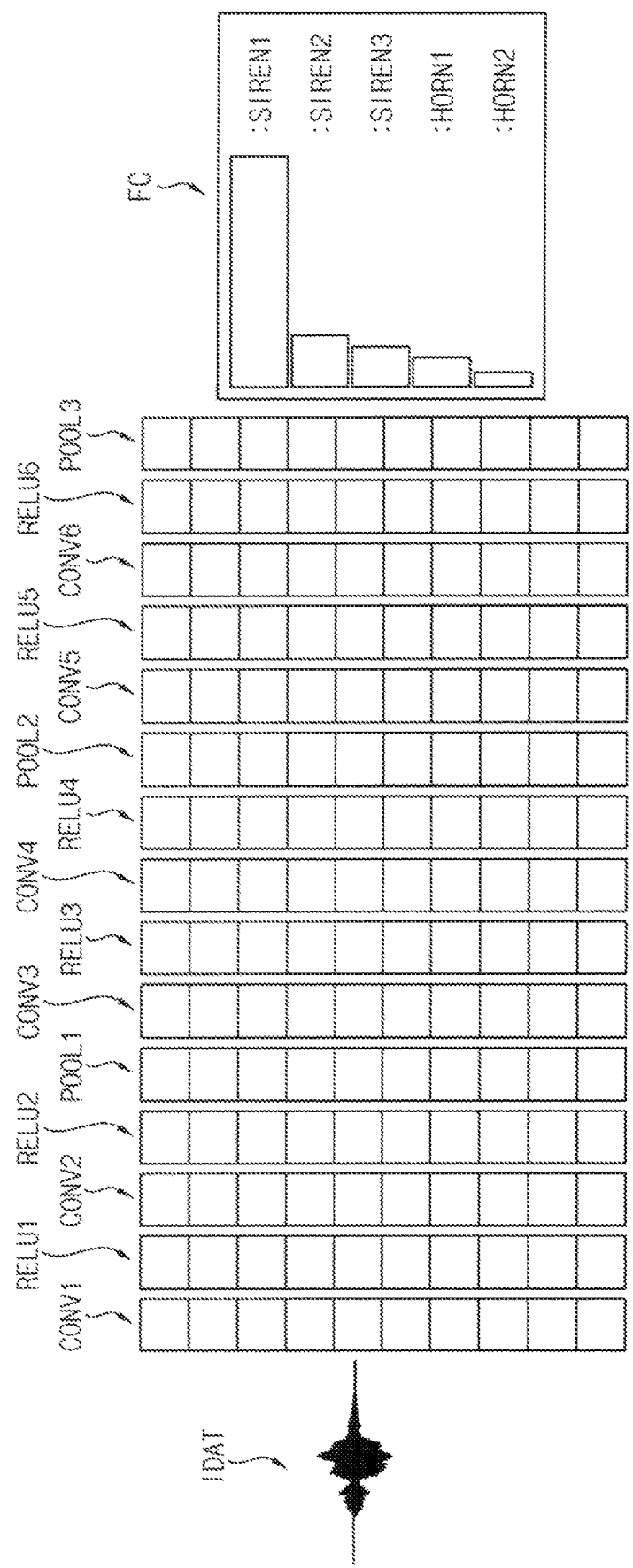
Figure 16:
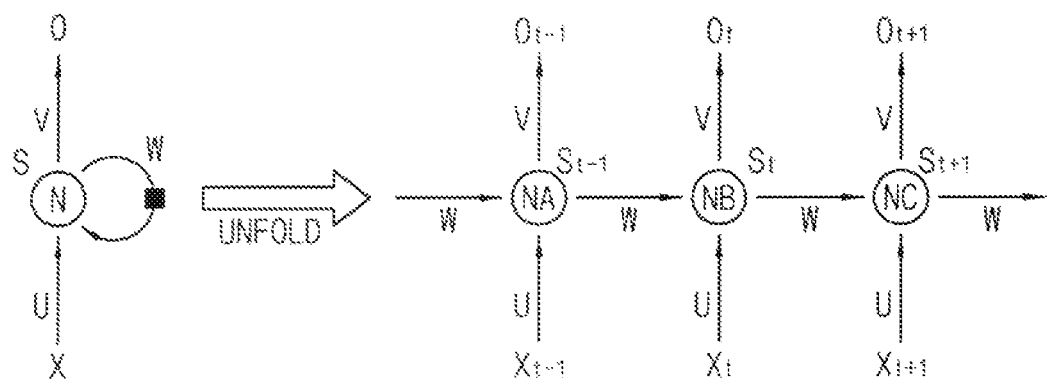

FIGS. 14, 15 and 16 are diagrams for describing an example of a network structure used to perform deep learning by a homomorphic operation performing device according to example embodiments.

Referring to FIG. 14, a general neural network (e.g., an ANN) may include an input layer IL, a plurality of hidden layers HL1, HL2, . . . , HLn and an output layer OL.

The input layer IL may include i input nodes $x_1$, $x_2$, . . . , $x_i$, where i is a natural number. Input data (e.g., vector input data) IDAT whose length is i may be input to the input nodes $x_1$, $x_2$, . . . , $x_i$ such that each element of the input data IDAT is input to a respective one of the input nodes $x_1$, $x_2$, . . . , $x_i$.

The plurality of hidden layers HL1, HL2, HLn may include n hidden layers, where n is a natural number, and may include a plurality of hidden nodes $h^1_1$, $h^1_2$, $h^1_3$, . . . , $h^1_m$, $h^2_1$, $h^2_2$, $h^2_3$, . . . , $h^2_m$, $h^n_1$, $h^n_2$, $h^n_3$, . . . , $h^n_m$. For example, the hidden layer HL1 may include m hidden nodes $h^1_1$, $h^1_2$, $h^1_3$, . . . , $h^1_m$, the hidden layer HL2 may include m hidden nodes $h^2_1$, $h^2_2$, $h^2_3$, . . . , $h^2_m$, and the hidden layer HLn may include m hidden nodes $h^n_1$, $h^n_2$, $h^n_3$, . . . , $h^n_m$, where m is a natural number.

The output layer OL may include j output nodes $y_1$, $y_2$, . . . , $y_j$, where j is a natural number. Each of the output nodes $y_1$, $y_2$, . . . , $y_j$ may correspond to a respective one of classes to be categorized. The output layer OL may output output values (e.g., class scores or simply scores) associated with the input data IDAT for each of the classes. The output layer OL may be referred to as a fully-connected layer and may indicate, for example, a probability that the input data IDAT corresponds to a car.

A structure of the neural network illustrated in FIG. 14 may be represented by information on branches (or connections) between nodes illustrated as lines, and a weighted value assigned to each branch, which is not illustrated. Nodes within one layer may not be connected to one another, but nodes of different layers may be fully or partially connected to one another.

Each node may receive an output of a previous node, may perform a computing operation, computation or calculation on the received output, and may output a result of the computing operation, computation or calculation as an output to a next node. For example, node $h^1_1$ may receive an output of a previous node $x_1$, may perform a computing operation, computation or calculation on the received output of the previous node x1, and may output a result of the computing operation, computation or calculation as an output to a next node $h^2_1$. Each node may calculate a value to be output by applying the input to a specific function, e.g., a nonlinear function.

Generally, the structure of the neural network is set in advance, and the weighted values for the connections between the nodes are set appropriately using data having an already known answer of which class the data belongs to. The data with the already known answer is referred to as "training data," and a process of determining the weighted value is referred to as "training." The neural network "learns" during the training process. A group of an independently trainable structure and the weighted value is referred to as a "model," and a process of predicting, by the model with the determined weighted value, which class the input data belongs to, and then outputting the predicted value, is referred to as a "testing" process.

The general neural network illustrated in FIG. 14 may not be suitable for handling input image data (or input sound data) because each node (e.g., the node $h^1_1$) is connected to all nodes of a previous layer (e.g., the nodes $x_1$, $x_2$, . . . , $x_i$ included in the layer IL) and then the number of weighted values drastically increases as the size of the input image data increases. Thus, a convolutional neural network (CNN), which is implemented by combining the filtering technique with the general neural network, has been researched such that two-dimensional image (e.g., the input image data) is efficiently trained by the CNN.

Referring to FIG. 15, a CNN may include a plurality of layers CONV1, RELU1, CONV2, RELU2, POOL1, CONV3, RELU3, CONV4, RELU4, POOL2, CONV5, RELU5, CONV6, RELU6, POOL3 and FC. Here, CONV is a convolution layer, RELU is a Rectified Linear Unit, POOL is a pooling layer and FC is a fully connected layer.

Unlike the general neural network, each layer of the CNN may have three dimensions of width, height and depth, and thus data that is input to each layer may be volume data having three dimensions of width, height and depth. For example, if an input image in FIG. 15 has a size of 32 widths (e.g., 32 pixels) and 32 heights and three color channels R, G and B, input data IDAT corresponding to the input image may have a size of 32*32*3. The input data IDAT in FIG. 15 may be referred to as input volume data or input activation volume.

Each of convolutional layers CONV1, CONV2, CONV3, CONV4, CONV5 and CONV6 may perform a convolutional operation on input volume data. In an image processing, the convolutional operation represents an operation in which image data is processed based on a mask with weighted values and an output value is obtained by multiplying input values by the weighted values and adding up the total multiplied values. The mask may be referred to as a filter, window or kernel.

Particularly, parameters of each convolutional layer may include of a set of learnable filters. Every filter may be small spatially (along width and height), but may extend through the full depth of an input volume. For example, during the forward pass, each filter may be slid (more precisely, convolved) across the width and height of the input volume, and dot products may be computed between the entries of the filter and the input at any position. As the filter is slid over the width and height of the input volume, a two-dimensional activation map that gives the responses of that filter at every spatial position may be generated. As a result, an output volume may be generated by stacking these activation maps along the depth dimension. For example, if input volume data having a size of 32*32*3 passes through the convolutional layer CONV1 having four filters with zero-padding, output volume data of the convolutional layer CONV1 may have a size of 32*32*12 (e.g., a depth of volume data increases).

Each of RELU layers RELU1, RELU2, RELU3, RELU4, RELU5 and RELU6 may perform a rectified linear unit (RELU) operation that corresponds to an activation function defined by, e.g., a function f(x)=max(0, x) (e.g., an output is zero for all negative input x). For example, if input volume data having a size of 32*32*12 passes through the RELU layer RELU1 to perform the rectified linear unit operation, output volume data of the RELU layer RELU1 may have a size of 32*32*12 (e.g., a size of volume data is maintained).

Each of pooling layers POOL1, POOL2 and POOL3 may perform a down-sampling operation on input volume data along spatial dimensions of width and height. For example, four input values arranged in a 2*2 matrix formation may be converted into one output value based on a 2*2 filter. For example, a maximum value of four input values arranged in a 2*2 matrix formation may be selected based on 2*2 maximum pooling, or an average value of four input values arranged in a 2*2 matrix formation may be obtained based on 2*2 average pooling. For example, if input volume data having a size of 32*32*12 passes through the pooling layer POOL1 having a 2*2 filter, output volume data of the pooling layer POOL1 may have a size of 16*16*12 (e.g., width and height of volume data decreases, and a depth of volume data is maintained).

Typically, one convolutional layer (e.g., CONV1) and one RELU layer (e.g., RELU1) may form a pair of CONV/RELU layers in the CNN, pairs of the CONV/RELU layers may be repeatedly arranged in the CNN, and the pooling layer may be periodically inserted in the CNN, thereby reducing a spatial size of image and extracting a characteristic of image.

An output layer or a fully-connected layer FC may output results (e.g., class scores) of the input volume data IDAT for each of the classes. For example, the input volume data IDAT corresponding to the two-dimensional image may be converted into an one-dimensional matrix or vector as the convolutional operation and the down-sampling operation are repeated. For example, the fully-connected layer FC may represent probabilities that the input volume data IDAT corresponds to a car, a truck, an airplane, a ship and a horse.

The types and number of layers included in the CNN may not be limited to an example described with reference to FIG. 15 and may be changed according to example embodiments. In addition, although not illustrated in FIG. 15, the CNN may further include other layers such as a softmax layer for converting score values corresponding to predicted results into probability values, a bias adding layer for adding at least one bias, or the like.

Referring to FIG. 16, a recurrent neural network (RNN) may include a repeating structure using a specific node or cell N illustrated on the left side of FIG. 16.

A structure illustrated on the right side of FIG. 16 may represent that a recurrent connection of the RNN illustrated on the left side is unfolded (or unrolled). The term "unfolded" means that the network is written out or illustrated for the complete or entire sequence including all nodes NA, NB and NC. For example, if the sequence of interest is a sentence of 3 words, the RNN may be unfolded into a 3-layer neural network, one layer for each word (e.g., without recurrent connections or without cycles).

In the RNN in FIG. 16, X represents an input of the RNN. For example, $X_t$ may be an input at time step t, and $X_{t-1}$ and $X_{t+1}$ may be inputs at time steps t−1 and t+1, respectively.

In the RNN in FIG. 16, S represents a hidden state. For example, $S_t$ may be a hidden state at the time step t, and $S_{t-1}$ and $S_{t+1}$ may be hidden states at the time steps t−1 and t+1, respectively. The hidden state may be calculated based on a previous hidden state (W) and an input at a current step (U). For example, $S_t=f(UX_t+WS_{t-1})$. For example, the function f may be usually a nonlinearity function such as tanh or RELU. $S_{-1}$, which is required to calculate a first hidden state, may be typically initialized to all zeroes.

In the RNN in FIG. 16, O represents an output of the RNN. For example, $O_t$ may be an output at the time step t, and $O_{t-1}$ and $O_{t+1}$ may be outputs at the time steps t−1 and t+1, respectively. For example, if it is required to predict a next word in a sentence, it would be a vector (V) of probabilities across a vocabulary. For example, Ot=softmax (VSt).

In the RNN in FIG. 16, the hidden state may be a "memory" of the network. In other words, the RNN may have a "memory" which captures information about what has been calculated so far. The hidden state St may capture information about what happened in all the previous time steps. The output Ot may be calculated solely based on the memory at the current time step t. In addition, unlike a traditional neural network, which uses different parameters at each layer, the RNN may share the same parameters across all time steps. This may represent the fact that the same task may be performed at each step, just with different inputs. This may greatly reduce the total number of parameters required to be trained or learned.

In some example embodiments, various services and/or applications such as an image classify service, a user authentication service based on biometric information, an advanced driver assistance system (ADAS) service, a voice assistant service, an automatic speech recognition (ASR) service, and the like may be executed and processed based on the homomorphic operation accelerator or the homomorphic operation managing circuit described above with reference to FIGS. 6, 7 and 13.

Figure 17:
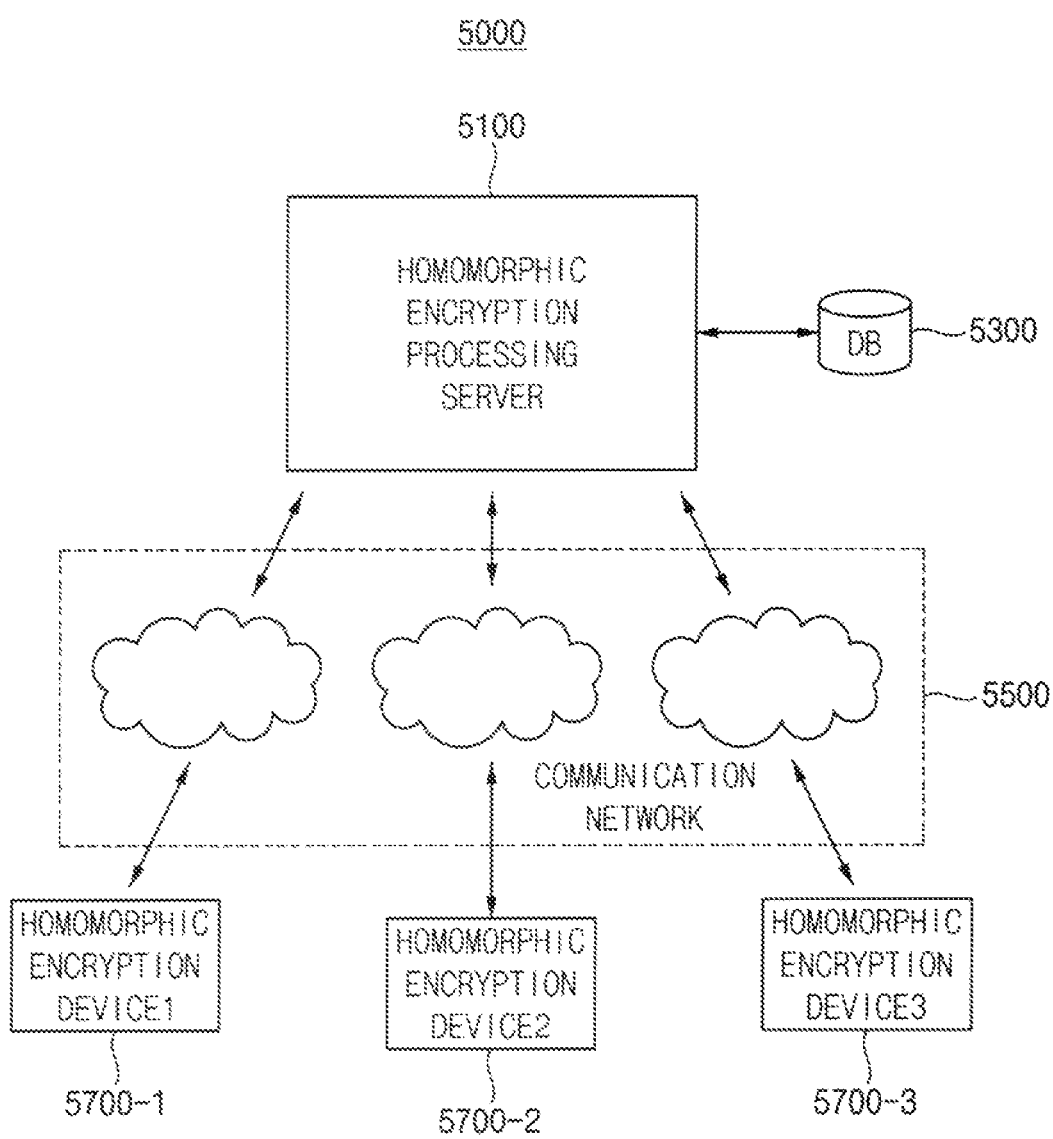
FIG. 17 is a block diagram illustrating a homomorphic operation performing system including a homomorphic operation performing device according to one or more example embodiments.

FIG. 17 is a block diagram illustrating a homomorphic operation performing system including a homomorphic operation performing device according to one or more example embodiments.

Referring to FIG. 17, a homomorphic encryption performing system 5000 may include a homomorphic encryption processing server 5100, a database 5300, a communication network 5500 and one or more homomorphic encryption devices 5700-1, 5700-2 and 5700-3.

The homomorphic encryption processing server 5100 may correspond to the homomorphic encryption processing server 100 described above with reference to FIG. 1, and each of the homomorphic encryption devices 5700-1, 5700-2 and 5700-3 may correspond to one of the first homomorphic encryption client 300 or the second homomorphic encryption client 500 described above with reference to FIG. 1.

The homomorphic encryption devices 5700-1, 5700-2 and 5700-3 may include computing devices or communication terminals having a communication function, and may include mobile phones, smart phones, tablet personal computers (PCs), mobile internet devices (MIDs), intern& tablets, and Internet of Things (IoT) devices, or wearable computers, but example embodiments are not limited thereto. As such, the homomorphic encryption devices 5700-1, 5700-2 and 5700-3 may include other electronic devices.

The communication network 5500 may include a local area network LAN, a wide area network WAN, an Internet (World Wide Web WWW), a wired/wireless data communication network, a telephone network, a wired/wireless television communication network, and the like.

The wireless communication network may be one of a 3G, a 4G, a 5G, a 3GPP (3rd Generation Partnership Project), a LTE (Long Term Evolution), a WIMAX (World Interoperability for Microwave Access), a WiFi, a Bluetooth communication, an infrared communication, an ultrasonic communication, a Visible Light Communication VLC and a Li-Fi, but example embodiments are not limited thereto.

According to an example embodiment, there is provided a homomorphic operation performing device comprising: a memory storing one or more instructions; and a processor configured to execute the one or more instruction to: receive ciphertext data, homomorphic encryption information and homomorphic operation information, the homomorphic encryption information being associated with a homomorphic encryption algorithm used to generate the ciphertext data, and the homomorphic operation information being associated with homomorphic operations to be performed on the ciphertext data, generate one or more enable signals to selectively activate one or more first circuits, among a plurality of circuits configured to perform homomorphic operations, based on the homomorphic encryption information and the homomorphic operation information, selectively activate one or more first circuits based on the one or more enable signals, and control the one or more first circuit to perform the homomorphic operations on the ciphertext data based on the one or more first circuit that are selectively activated. According to example embodiment, second circuits other than the one or more first circuits, among the plurality of circuits, are deactivated.

As described above, a homomorphic operation accelerator and a homomorphic operation performing device according to one or more example embodiments may receive homomorphic encryption information and homomorphic operation information, may selectively deactivate a plurality of circuits included in the homomorphic operation performing device based on the homomorphic encryption information and the homomorphic operation information. Accordingly, by reducing a usage of hardware resources corresponding to homomorphic encryption algorithm, the homomorphic operations may be efficiently performed. Example embodiments of the disclosure may be implemented in a form of a system, a method or a product including a computer-readable program code stored in a computer-readable medium.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A homomorphic operation accelerator comprising:
   a plurality of circuits configured to perform homomorphic operations; and
   a homomorphic operation managing circuit configured to:
   receive ciphertext data, homomorphic encryption information and homomorphic operation information, the homomorphic encryption information being associated with a homomorphic encryption algorithm used to generate the ciphertext data, and the homomorphic operation information being associated with homomorphic operations to be performed on the ciphertext data;
   selectively activate or deactivate each of a plurality of enable signals applied to the plurality of circuits based on the homomorphic encryption information and the homomorphic operation information; and
   activate or deactivate each of the plurality of circuits based on the plurality of enable signals,
   wherein the homomorphic operations are performed on the ciphertext data based on activated circuits among the plurality of circuits,
   wherein, based on the homomorphic operations corresponding to a first arithmetic operation and the homomorphic encryption algorithm being a first type of homomorphic encryption algorithm, the homomorphic operation managing circuit is further configured to deactivate a first type of circuit, among the plurality of circuits, and
   wherein, based on the homomorphic operations corresponding to a second arithmetic operation and the homomorphic encryption algorithm being a second type of homomorphic encryption algorithm, the homomorphic operation managing circuit is further configured to deactivate a second type of circuit, among the plurality of circuits.

2. The homomorphic operation accelerator of claim 1, wherein:
   the plurality of circuits include a homomorphic multiplier including a Chinese remainder theorem (CRT) circuit, an inverse CRT circuit, a number theoretic transform (NTT) circuit, an inverse NTT circuit, a modular shift up circuit, a modular shift down circuit, a modular adder and a modular multiplier, and
   based on the homomorphic operations corresponding to a homomorphic addition, the homomorphic operation managing circuit is further configured to deactivate the CRT circuit, the inverse CRT circuit, the NTT circuit, the inverse NTT circuit, the modular shift up circuit, the modular shift down circuit, the modular adder and the modular multiplier.

3. The homomorphic operation accelerator of claim 1, wherein:
the plurality of circuits include a homomorphic multiplier including a Chinese remainder theorem (CRT) circuit, an inverse CRT circuit, a number theoretic transform (NTT) circuit, an inverse NTT circuit, a modular shift up circuit, a modular shift down circuit, a modular adder and a modular multiplier, and
based on the homomorphic operations corresponding to a homomorphic multiplication and the homomorphic encryption algorithm is based on a residual number system (RNS), the homomorphic operation managing circuit is further configured to deactivate the CRT circuit and the inverse CRT circuit and configured to activate the NTT circuit, the inverse NTT circuit, the modular shift up circuit, the modular shift down circuit, the modular adder and the modular multiplier.

4. The homomorphic operation accelerator of claim 1, wherein:
the plurality of circuits include a homomorphic multiplier including a Chinese remainder theorem (CRT) circuit, an inverse CRT circuit, a number theoretic transform (NTT) circuit, an inverse NTT circuit, a modular shift up circuit, a modular shift down circuit, a modular adder and a modular multiplier, and
based on the homomorphic operations corresponding to a homomorphic multiplication and the homomorphic encryption algorithm is based on a number system other than a RNS, the homomorphic operation managing circuit is further configured to activate the CRT circuit, the inverse CRT circuit, the NTT circuit, the inverse NTT circuit, the modular shift up circuit, the modular shift down circuit, the modular adder and the modular multiplier.

5. The homomorphic operation accelerator of claim 1, wherein:
the plurality of circuits include a first key switching circuit corresponding to a first homomorphic encryption algorithm, a second key switching circuit corresponding to a second homomorphic encryption algorithm, a third key switching circuit corresponding to a third homomorphic encryption algorithm, and a fourth key switching circuit corresponding to a fourth homomorphic encryption algorithm, and
based on the homomorphic encryption algorithm corresponding to the first homomorphic encryption algorithm, the homomorphic operation managing circuit is further configured to activate the first key switching circuit and is further configured to deactivate the second key switching circuit, the third key switching circuit and the fourth key switching circuit.

6. The homomorphic operation accelerator of claim 1, wherein:
the plurality of circuits include a homomorphic adder, a homomorphic multiplier and a bootstrapping circuit; and
the homomorphic operation managing circuit is further configured to control one of the homomorphic adder, the homomorphic multiplier and the bootstrapping circuit based on the homomorphic encryption information and the homomorphic operation information to perform one of a homomorphic addition, a homomorphic multiplication and a bootstrapping on the cipher text data.

7. The homomorphic operation accelerator of claim 6, wherein:
based on the homomorphic operations corresponding to a homomorphic addition, the homomorphic operation managing circuit is further configured to activate the homomorphic adder, and deactivate the homomorphic multiplier and the bootstrapping circuit.

8. The homomorphic operation accelerator of claim 6, wherein:
based on the homomorphic operations corresponding to a homomorphic multiplication, the homomorphic operation managing circuit is further configured to activate the homomorphic multiplier and deactivate the homomorphic adder and the bootstrapping circuit.

9. The homomorphic operation accelerator of claim 1, wherein:
the homomorphic encryption algorithm includes a first homomorphic encryption algorithm, a second homomorphic encryption algorithm, a third homomorphic encryption algorithm and a fourth homomorphic encryption algorithm, each of the first to fourth homomorphic encryption algorithms being a grid-based encryption algorithm,
the first and the third homomorphic encryption algorithms are based on an integer number system,
the second and the fourth homomorphic encryption algorithms are based on a complex number system,
the first and the second homomorphic encryption algorithms are based on a number system other than a residual number system (RNS), and
the third and the fourth homomorphic encryption algorithms are based on the RNS.

10. The homomorphic operation accelerator of claim 1, wherein:
the homomorphic operations include a homomorphic addition and a homomorphic multiplication, and
the homomorphic operation information includes logical or temporal information for sequentially performing the homomorphic addition or the homomorphic multiplication.

11. The homomorphic operation accelerator of claim 1, wherein:
the plurality of circuits include a homomorphic multiplier, which comprise a plurality of Chinese remainder theorem-number theoretic transform CRT-NTT circuits and a plurality of inverse NTT-inverse CRT (INTT-ICRT) circuits, and
the homomorphic operation managing circuit is further configured to activate or deactivate each of the plurality of CRT-NTT circuits and the plurality of INTT-ICRT circuits based on the homomorphic encryption information and the homomorphic operation information.

12. The homomorphic operation accelerator of claim 11, wherein:
based on the homomorphic operations corresponding to a homomorphic addition, the homomorphic operation managing circuit is further configured to deactivate the plurality of CRT-NTT circuits and the plurality of INTT-ICRT circuits.

13. The homomorphic operation accelerator of claim 11, wherein:
based on the homomorphic operations corresponding to a homomorphic multiplication and the homomorphic encryption algorithm is based on a residual number system (RNS), the homomorphic operation managing circuit is further configured to deactivate the plurality of CRT-NTT circuits and the plurality of INTT-ICRT circuits.

14. The homomorphic operation accelerator of claim 13, wherein:

based on the homomorphic operations corresponding to a homomorphic multiplication and the homomorphic encryption algorithm represented by the homomorphic encryption information is based on a number system other than the RNS, the homomorphic operation managing circuit is further configured to activate the plurality of CRT-NTT circuits and the plurality of INTT-ICRT circuits.

15. A homomorphic operation performing device comprising:

a communication interface configured to communicate with a first homomorphic encryption client to receive cipher text data and a second homomorphic encryption client to receive homomorphic operation information associated with homomorphic operations to be performed on the cipher text data; and a homomorphic operation accelerator including a plurality of circuits that perform the homomorphic operations, the homomorphic operation accelerator configured to:

selectively activate or deactivate each of a plurality of enable signals applied to the plurality of circuits based on the homomorphic operation information and a homomorphic encryption information, the homomorphic encryption information being associated with a homomorphic encryption algorithm used to generate the cipher text data; and activate or deactivate each of the plurality of circuits based on the plurality of enable signals, wherein the homomorphic operations are performed on the cipher text data based on activated circuits among the plurality of circuits, wherein, based on the homomorphic operations corresponding to a first arithmetic operation and the homomorphic encryption algorithm being a first type of homomorphic encryption algorithm, the homomorphic operation accelerator is further configured to deactivate a first type of circuit, among the plurality of circuits, and wherein, based on the homomorphic operations corresponding to a second arithmetic operation and the homomorphic encryption algorithm being a second type of homomorphic encryption algorithm, the homomorphic operation accelerator is further configured to deactivate a second type of circuit, among the plurality of circuits.

16. The homomorphic operation performing device of claim 15, wherein:

the plurality of circuits include a homomorphic multiplier including a plurality of Chinese remainder theorem-number theoretic transform (CRT-NTT) circuits and a plurality of inverse NTT-inverse CRT (INTT-ICRT) circuits, and the homomorphic operation accelerator is further configured to selectively activate or deactivate each of the plurality of CRT-NTT circuits and the plurality of INTT-ICRT circuits based on the homomorphic encryption information and the homomorphic operation information.

17. The homomorphic operation performing device of claim 16, wherein:

based on the homomorphic operations corresponding to a homomorphic addition, the homomorphic operation accelerator is further configured to deactivate the plurality of CRT-NTT circuits and the plurality of INTT-ICRT circuits.

18. The homomorphic operation performing device of claim 16, wherein:

based on the homomorphic operations corresponding to a homomorphic multiplication and the homomorphic encryption algorithm is based on a residual number system (RNS), the homomorphic operation accelerator is further configured to deactivate the plurality of CRT-NTT circuits and the plurality of INTT-ICRT circuits.

19. The homomorphic operation performing device of claim 18, wherein:

based on the homomorphic operations corresponding to a homomorphic multiplication and the homomorphic encryption algorithm represented by the homomorphic encryption information is based on a number system other than the RNS, the homomorphic operation accelerator is further configured to activate the plurality of CRT-NTT circuits and the plurality of INTT-ICRT circuits.

20. A homomorphic operation accelerator comprising:

a plurality of circuits including a homomorphic adder, a homomorphic multiplier and a bootstrapping circuit; and a homomorphic operation managing circuit configured to:

receive cipher text data, homomorphic encryption information and homomorphic operation information from an external device, the homomorphic encryption information being associated with a homomorphic encryption algorithm used to generate the cipher text data, the homomorphic operation information being associated with homomorphic operations to be performed on the cipher text data;

selectively activate or deactivate each of a plurality of enable signals applied to the plurality of circuits based on the homomorphic encryption information and the homomorphic operation information;

activate or deactivate each of the plurality of circuits based on the plurality of enable signals; and control one of the homomorphic adder, the homomorphic multiplied and the bootstrapping circuit based on the homomorphic encryption information and the homomorphic operation information to perform one of a homomorphic addition, a homomorphic multiplication and a bootstrapping on the cipher text data, wherein the homomorphic operations are performed on the cipher text data based on activated circuits among the plurality of circuits, wherein, based on the homomorphic operations corresponding to a first arithmetic operation and the homomorphic encryption algorithm being a first type of homomorphic encryption algorithm, the homomorphic operation managing circuit is further configured to deactivate a first type of circuit, among the plurality of circuits, and wherein, based on the homomorphic operations corresponding to a second arithmetic operation and the homomorphic encryption algorithm being a second type of homomorphic encryption algorithm, the homomorphic operation managing circuit is further configured to deactivate a second type of circuit, among the plurality of circuits.

* * * * *